(12) United States Patent
McCoy et al.

(10) Patent No.: US 11,367,130 B2
(45) Date of Patent: Jun. 21, 2022

(54) METHOD FOR IN-STORE OBJECT HIGHLIGHTING BY A REAL WORLD USER INTERFACE

(71) Applicant: SONY INTERACTIVE ENTERTAINMENT LLC, San Mateo, CA (US)

(72) Inventors: Charles McCoy, Coronado, CA (US); Leo Pedlow, Ramona, CA (US); True Xiong, San Diego, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 16/883,201

(22) Filed: May 26, 2020

(65) Prior Publication Data

US 2020/0357042 A1 Nov. 12, 2020

Related U.S. Application Data

(63) Continuation of application No. 15/584,186, filed on May 2, 2017, now abandoned, which is a continuation
(Continued)

(51) Int. Cl.
*G06Q 30/00* (2012.01)
*G06Q 30/06* (2012.01)
*G06V 10/10* (2022.01)

(52) U.S. Cl.
CPC ..... *G06Q 30/0641* (2013.01); *G06Q 30/0623* (2013.01); *G06Q 30/0639* (2013.01);
(Continued)

(58) Field of Classification Search
CPC ..... G06Q 30/0601–0645; G06Q 30/08; G06V 10/10
(Continued)

(56) References Cited

U.S. PATENT DOCUMENTS 5,563,988 A 10/1996 Maes
8,073,198 B2 12/2011 Marti
(Continued)

OTHER PUBLICATIONS

Henry, Alan, "How Retail Stores Track You Using Your Smartphone (and How to Stop It)", Jul. 19, 2013, LifeHacker.com, accessed at [https://lifehacker.com/how-retail-stores-track-you-using-your-smartphone-and-827512308] (Year: 2013).*
(Continued)

*Primary Examiner* — Jeffrey A. Smith
*Assistant Examiner* — Lindsey B Smith

(57) ABSTRACT

Systems and methods according to present principles involved highlighting objects such as on a store shelf. Highlighting is displayed by projecting a light directly on the object by means of a light source or may alternatively be indicated by displaying an indicator or image of the object on a display screen. Information about the targeted object may appear in a headmounted display, on a user's mobile device, or may be projected on a surface via the projector. Information provided to a user may include comparison product data, data about potential allergens, and the like. Highlighting can also be employed to suggest items of interest to the user. For example, products may be recommended to a user through analysis of user data and such products illuminated by a projector as a user walks through a store. Other highlighted objects may be those on a user grocery list or the like.

8 Claims, 22 Drawing Sheets

Related U.S. Application Data of application No. 14/259,581, filed on Apr. 23, 2014, now Pat. No. 9,639,887.

(52) U.S. Cl.
CPC ......... *G06V 10/10* (2022.01); *G06Q 30/0625* (2013.01); *G06Q 30/0633* (2013.01)

(58) Field of Classification Search
USPC .............................................. 705/26.1–27.2
See application file for complete search history.

(56) References Cited

U.S. PATENT DOCUMENTS

| | | | |
|---|---|---|---|
| 8,599,132 B2 | 12/2013 | Chen | |
| 9,098,871 B2 | 8/2015 | Argue | |
| 2010/0082447 A1 | 4/2010 | Lin | |
| 2010/0199232 A1* | 8/2010 | Mistry | G06F 3/0425 715/863 |
| 2010/0253787 A1* | 10/2010 | Grant | G06Q 30/0603 348/207.1 |
| 2010/0262554 A1* | 10/2010 | Elliott | G01C 21/20 705/323 |
| 2011/0221669 A1 | 9/2011 | Shams et al. | |
| 2012/0278727 A1 | 11/2012 | Ananthakrishnan | |
| 2012/0302289 A1 | 11/2012 | Kang | |
| 2013/0010068 A1 | 1/2013 | Tiernan | |
| 2013/0021374 A1 | 1/2013 | Miao et al. | |
| 2013/0085345 A1 | 4/2013 | Geisner | |
| 2013/0176398 A1* | 7/2013 | Bonner | G06F 3/01 345/173 |
| 2013/0223673 A1 | 8/2013 | Davis | |
| 2013/0283161 A1 | 10/2013 | Reimann | |
| 2013/0321462 A1 | 10/2013 | Salter | |
| 2014/0063055 A1* | 3/2014 | Osterhout | G06F 3/165 345/633 |
| 2014/0104163 A1 | 4/2014 | Ide | |
| 2014/0195374 A1 | 7/2014 | Bassemir | |
| 2014/0201685 A1 | 7/2014 | Lim | |
| 2014/0214601 A1* | 7/2014 | Argue | G06T 7/00 705/26.8 |
| 2014/0214628 A1* | 7/2014 | Argue | G06Q 50/01 705/27.1 |
| 2015/0009124 A1 | 1/2015 | Antoniac | |
| 2015/0019391 A1* | 1/2015 | Kumar | G06Q 10/087 705/28 |

OTHER PUBLICATIONS

Brothatech, "The 'Google Maps of Supermarkets' App AisleFinder is Now on Android" Jan. 6, 2012, pp. 1-2.

Mistry, "SixthSense", Published 2009, downloaded at http://www.pranavmistry.com/projects/sixthsense/ 5 pages.

Harrison et al. "OmniTouch", published Oct. 18, 2011, downloaded at http://www.kurzweilai.net/wearable-projection-system-turns-any-surface-into-a multitouch . . . , 3 pages.

\* cited by examiner

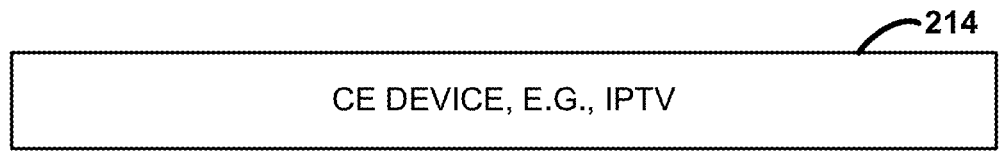
(A) 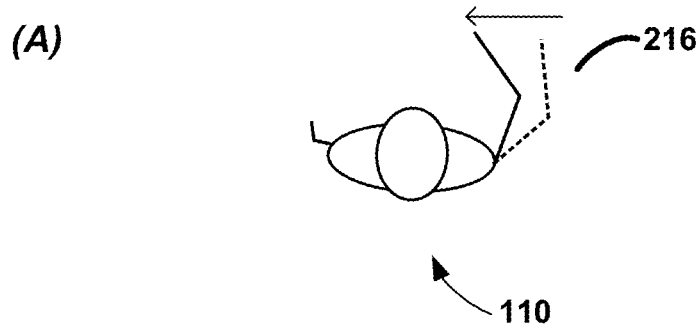
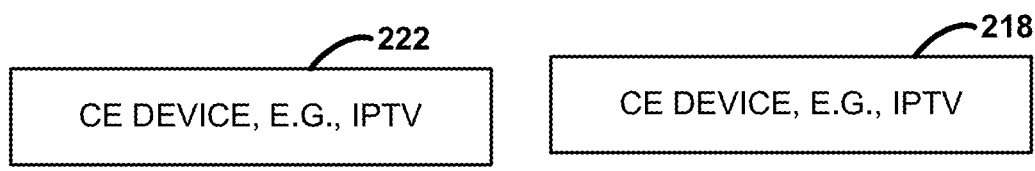
(B) 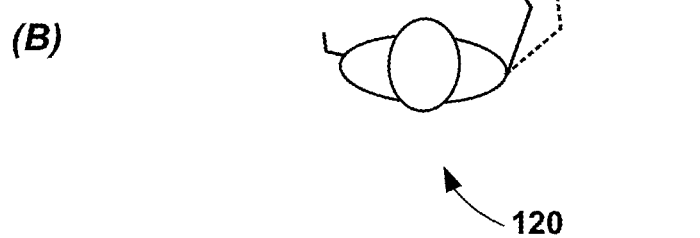
FIG. 8

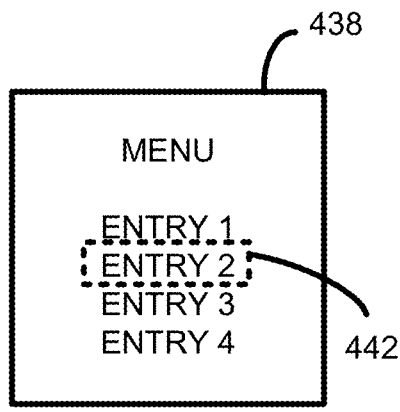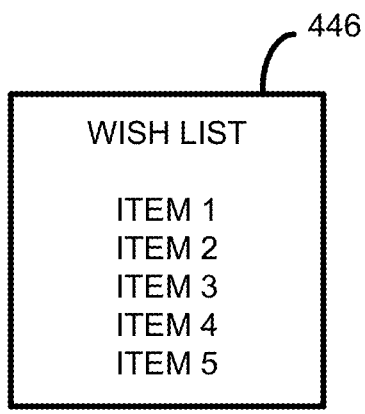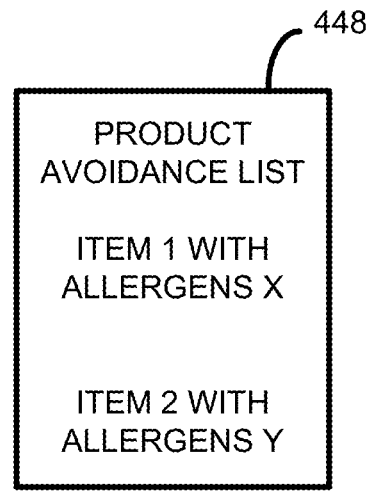
FIG. 14

COMPARATIVE ITEMS

| ITEM | PRICE |
|---|---|
| ITEM 1 | $___ |
| ITEM 2 | $___ |
| ITEM 3 | $___ |
| ITEM 4 | $___ |
| ITEM 5 | $___ |

BEST VALUE! _____

(A) 464

466

COMPARATIVE QUANTITIES / SAME ITEM

| ITEM | PRICE/UNIT |
|---|---|
| QTY 1 | $___/UNIT |
| QTY 2 | $___/UNIT |
| QTY 3 | $___/UNIT |
| QTY 4 | $___/UNIT |
| QTY 5 | $___/UNIT |

BEST VALUE! _____

(B)

468     472     474

| THIS STORE | NEIGHBORING STORES | ONLINE RETAILERS |

NUTRITIONAL DATA

| INGREDIENT | AMOUNT |
|---|---|
| ITEM 1 | — |
| ITEM 2 | — |
| ITEM 3 | — |
| ITEM 4 | — |
| ITEM 5 | — |

— 476

(A)

POPULAR/TRENDING ITEMS

| ITEM | PRICE |
|---|---|
| ITEM 1 | $__ |
| ITEM 2 | $__ |
| ITEM 3 | $__ |
| ITEM 4 | $__ |
| ITEM 5 | $__ |

BEST VALUE! _____

METHOD FOR IN-STORE OBJECT HIGHLIGHTING BY A REAL WORLD USER INTERFACE

BACKGROUND

User interaction with virtual objects is ubiquitous in computing, and in particular in online environments. Such interactions include selecting objects as indicated on menus or in images, searching to discover additional details about the objects, retrieving additional images corresponding to the object, and the like. These interactions are generally facilitated by keyboard and mouse commands, pressing buttons generated on touchscreen displays, as well as in some cases by voice commands.

Certain efforts have been made at accomplishing interactions with computing devices at a more "real world" level. For example, in certain current eyewear, devices are provided in which a user may record video of a viewed scene using voice commands. It is also known to use body motions to control a UI, e.g., for a game and a game console, e.g., as supported by the Sony Move® system.

However, such devices still fail to provide a full-featured system. In particular, such devices are limited in their ability to provide users with information. For example, while it is known to provide information about items visualized by a camera, including items viewed in a headmounted camera, such systems are highly limited and rely on significant user input for operation, as well as in many cases a separate cellular connection. In addition, the information is generally limited.

These limitations are especially felt when a user is away from a laptop or other computing device with a substantial form factor, instead relying on a mobile device. Despite significant improvements in computing power with mobile devices, the same still have limited input and output capabilities.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Systems and methods according to present principles involved highlighting objects such as on a store shelf. Highlighting is displayed by projecting a light directly on the object by means of a light source or may alternatively be indicated by displaying an indicator or image of the object on a display screen. Details of the construction and processes of such systems and methods are described in Applicant's co-pending U.S. patent application Ser. No. 14/259,520, filed Apr. 23, 2014, assigned to the assignee of the present application, and herein incorporated by reference in its entirety.

Information about the targeted object may appear in a headmounted display, on a user's mobile device, or may be projected on a surface via the projector. Information provided to a user may include comparison product data, data about potential allergens, and the like.

Highlighting can also be employed to suggest items of interest to the user. For example, products may be recommended to a user through analysis of user data and such products illuminated by a projector as a user walks through a store (the system may have knowledge of store layout and/or may use a camera to recognize selected goods on a shelf as the user passes by). Other highlighted objects may be those on a user grocery list or the like.

Another way of interacting with highlighted objects is by use of a mobile device, connected to the camera and/or projector via Bluetooth® or other means. The mobile device camera may provide additional or primary object visualization as well as highlighting via internal light sources. A video camera in the mobile device may support the types of gesture control as disclosed in the patent application incorporated by reference above. Mobile devices with multiple cameras, e.g., front and rear, may also be supported. The mobile device may also be used to provide wireless (or wired) connectivity for a headmounted or wearable user interface system. The mobile device and camera can also share image analysis and processing functionality, e.g., a camera system can identify individual objects in an image, and the mobile device can isolate that part of the image for identification of the object. Server functionality may be leveraged for additional processing and analysis. The real world object UI may also control aspects of the mobile device or other nearby devices, such as via IR codes, Bluetooth, a network connection, or the like.

As noted, a remote server can be employed to perform image analysis, e.g., for object isolation and identification. In this system, a camera or mobile device may attempt such object isolation and identification, but upon a failed attempt, may send image data to the remote server for further analysis. The server may also be employed for language translation, accessing data about user interests for potential object highlighting or recommendation, storage of information about objects which are of interest to a user as evidenced by the real world user interface, e.g., via gesturing, and the like. Servers receiving data from multiple sources may provide information about aggregated data.

Other variations will be seen. For example, network communications may be employed to communicate selected items for subsequent or contemporaneous online ordering. Previous actions performed by a user with respect to a particular product may be employed to inform future system actions. For example, using information on which objects were previously purchased by a user may aid in highlighting future products, e.g., when a regularly-purchased item is on sale.

In one aspect, the invention is directed towards an application, constituted of instructions stored on a non-transitory computer-readable medium, for causing a computing environment to perform the following steps: receiving a file representing an image; causing detection of an object pictured in the image; causing identification of the detected object; and causing light to be projected on the identified object, or causing an indicator of the identified object to be rendered on a device display.

Implementations of the invention may include one or more of the following. The file may represent a single image or a video series of images. The computing environment may include a mobile device, where a camera on the mobile device captures the image, and where the indicator is rendered on a display of the mobile device. The computing environment may also include a CAP device, and where a camera on the CAP device captures the image. The computing environment may also include a server. The object may represent an image of text in a first language, and the causing identification about the detected object may include: causing a performing of optical character recognition on the image to determine a text string; causing a performing of a translation of the text string into a second language; and where the causing light to be projected or causing an indicator to be rendered includes rendering the translated text. The detecting may further include receiving an indication from a user, the indication selecting the object. The indication may include picking up or handling the object. The indication may be received using analysis of the received image. The indication may be received from a user interface on which a user has indicated the object. The user interface may be associated with the device or the user interface may be associated with a camera, and the user indication may correspond to a gesture indicating the object. The causing identification may include causing detection of an object image, an object color or shape, a brand name or logo, an object identifying number, an object identifying QR code, or an object identifying bar code, and causing comparison of the image, color or shape, brand name or logo, number, QR code, or bar code, respectively, to respective quantities in a look-up table, and an object is thus identified when the object is found in the look-up table corresponding to the respective quantity. The steps may further include determining if the identified object is on a user list. The steps may further include, if the identified object is on a user list, then causing a light source to project light onto the identified object or causing the indication of the identified object to be rendered on the device. The identified object may be an entry on a list or menu. If the identified object is on a user list, then the steps may further include causing a light source to project information pertaining to the identified object or causing information pertaining to the identified object to be rendered on a device. The information pertaining to the identified object may be selected from the group consisting of: nutritional information, ingredient information, comparison shopping information about other products similar to the identified object, comparison shopping information about other quantities available of the identified object, including a price per unit, or an indication of a best value product, either of a particular quantity of the identified object or of a quantity and type of a product similar to the identified object. Where the identified object is at a given store, the comparison shopping information may be with respect to the given store, with respect to neighboring stores and/or the given store, or with respect to online retailers and/or the given store. If the identified object is on a user list, then the steps may further include causing an audio indication to be rendered about the identified object. The user list may be a shopping list, a wish list, a product avoidance list, a home inventory list, or is a potential interest list created from a user profile, a user shopping or purchasing history, or one or more user-created or user-determined rules. Where the user list is a product avoidance list, the projected light may project a warning onto the identified object or a warning about the identified object may be rendered on the device. The steps may further include receiving data about objects identified by other users and corresponding to the identified object, or about purchases made by other users and corresponding to the identified object, and causing a light source to project information, or causing an indication to be rendered on a mobile device, about the identified object and about the data about objects identified or purchased by other users. The steps may further include: causing the reception of a location of a user; causing a pre-loading of data about objects in or corresponding to the location, such that if the detected object corresponds to one of the objects in the location, data about the detected object is retrievable in a more rapid manner than in the absence of the pre-loading. The causing a performing step may be performed by a server. The analysis may be performed on a server. The causing identification step may be performed by a server. The receiving data step may be performed by a server. The causing the reception and causing a preloading steps may be performed by a server.

In another aspect, the invention is directed towards an application, constituted of instructions stored on a non-transitory computer-readable medium, for causing a computing environment to perform the following steps: receiving a file representing an image; attempting to detect or identify an object pictured in the image; if the attempting is unsuccessful, then receiving a file representing another image, the another image portraying the object from another view; detecting or identifying the object from the another image or from a combination of the image and the another image.

In a further aspect, the invention is directed towards an application, constituted of instructions stored on a non-transitory computer-readable medium, for causing a computing environment to perform the following steps: receiving a file representing an image; determining an object pictured in the image, where the determining includes one or both of: detecting an object pictured in the image or recognizing a selection of an object pictured in the image, the selection performed by a user performing a gesture; and adding the determined object to a user list.

Advantages of the invention may include one or more of the following. Certain systems and methods according to present principles may provide a way for users to obtain information about products by using a camera to identify products and a projection highlighting system to indicate targeted or selected products. Data may be filtered to provide information of most interest to the user, using user data. A display system may be provided to communicate information, and the same may be embodied in a headmounted display, a mobile device, or projection onto a nearby surface. Users of the system can obtain information about products or other objects without necessarily having to retrieve their mobile device from a pocket or purse.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

BRIEF DESCRIPTION OF THE DRAWINGS

FIG. 8(A) schematically illustrates gesture control of a CE device. FIG. 8(B) schematically illustrates gesture control between two consumer electronic devices.

FIGS. 14(A)-14(E) illustrate various types of user lists which may be employed according to present principles.

FIGS. 16(A)-16(C) illustrate various types of projected images, as well as buttons which may be employed by a user.

FIGS. 17(A)-17(B) illustrate various additional types of projected images.

Like reference numerals refer to like elements throughout.

DETAILED DESCRIPTION

Figure 1:
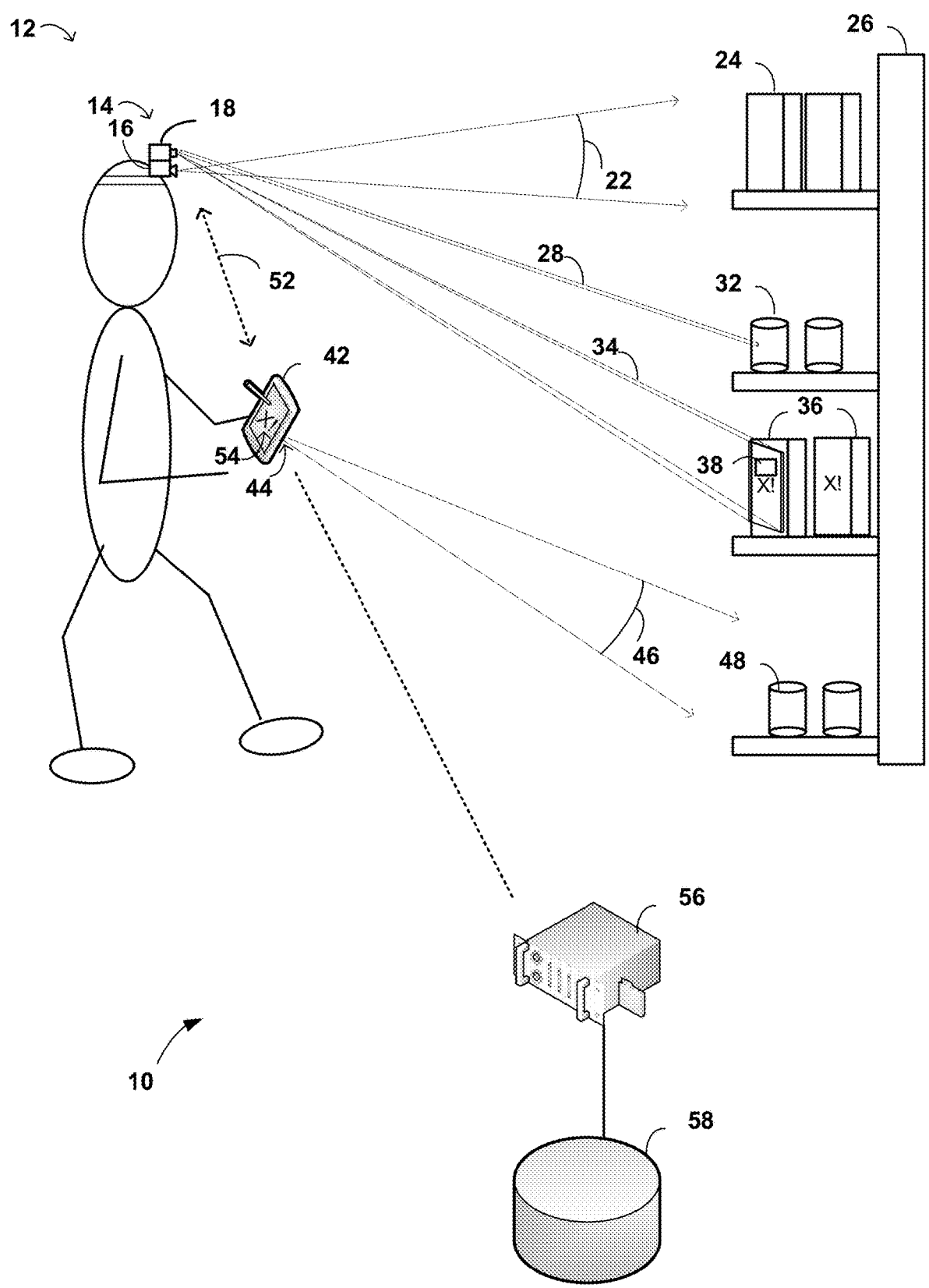
FIG. 1 is a schematic illustration of a user employing a system according to present principles to image, select, and highlight an object, as well as obtain additional information about the same.

Referring to FIG. 1, a system 10 according to present principles is illustrated in which a user 12 employs a camera and projection ("CAP") device 14, which in some implementations may be in data communication with a mobile device 42, to select and obtain information about real-world objects. In particular, real-world objects 24, 32, 36, and 48 are shown on shelves within a typical store rack 26, and are imaged by the CAP device 14 and in particular a camera 16 within the CAP device 14 which has a field of view indicated by the subtended solid angle 22. The camera 16 may attempt to analyze the entire image within its field of view 22, or a detection zone may be defined within the field of view as described below. Objects in the field of view or the detection zone may be analyzed against a database of objects to identify the objects and the identification used to enable the retrieval of additional information about the objects. For example, an item may be identified and a SKU or barcode discovered, which may then be used to search for additional information about the item. If information is available from the store itself in which the item is situated, even additional information may be obtained, calculated, or determined. For example, if the price can be determined, then a price per unit or other measure may be calculated and employed by the user for comparison shopping. Prices or other data may also be obtainable from online sources.

Besides the camera 16, the user 12 may have a mobile device 42 such as a smart phone, and a camera 44 associated with the smart phone 42 may be employed to image objects as well, either in lieu of or in addition to the camera 16. In FIG. 1, the camera 44 of the mobile device is shown having a field of view 46 and the same is imaging objects 48 on the bottom shelf of rack 26. One way of detecting objects is through detecting edges. Such detection may be performed visually, e.g., by detecting changes in color or hue, or may be performed from spatial information. Spatial information can be obtained by using multiple cameras to capture a 3-D view or may be determined from rangefinder sensors. In this latter case, edge detection may be performed by detecting when significant discontinuities exist in the distances of objects, indicating an edge has been reached.

The mobile device 42 may also be employed to display information about items selected, e.g., on a user interface 54. In cases where the CAP device 14 does not support mobile communications, mobile communications may be afforded by this capability on the mobile device 42. The CAP device 14 and the mobile device 42 may be in data communication via a connection 52, which may be Bluetooth®, infrared, or the like.

In order for the user to become aware of the object which is selected, an indicator of the selected item may be displayed on the user interface 54 of the mobile device 42, or via another display as described below, e.g., a wearable display. In lieu of such, or in addition thereto, a visible highlight may be provided on the object itself, such as by a wearable projector 18. The projector 18 may function in a number of ways. For example, a collimated beam 28 may be employed which shines on a selected object, the size of the collimated beam at the item generally smaller than most items. A broader or diverging beam 34 may also be provided, such as from an LCD or other video projector, but where the same has a target section 38 that appears different than the rest of the projected beam. For example, the target section may shimmer or move, and the shimmering or moving may be caused to appear on the selected, indicated, or focused object or item. To avoid ambiguity in object selection, the target section may also be generally smaller than the item or object. This beam is occasionally termed an "image" because the effect of the beam is to project an image on the object, and in particular an image with a target or highlight positioned on the selected object.

Whether collimated or diverging, to accomplish projection onto an item from a moving source (an ambulatory user), the projector is generally provided with a movable beam, the same being actuated by one or more small servomotors. The projector 18 is calibrated with respect to the camera 16, so that once an item is identified by the camera, the direction the projector must point to highlight the item is unambiguously identified. A direction, e.g., identified by angles in two different planes, may then be transmitted to the servomotors controlling the projector to allow the highlight to appear at the desired location. Again the highlight may be either a target in a diverging beam or the direction of a collimated beam.

Analysis of the received image may be in some cases performed on the mobile device 42 or even performed within the CAP device 14. Such analysis may then result in the determination of the identity of the selected item. However, in many cases, to obtain current information and data about items, as well as pricing information, data about the identified object or item may be sent to a server 56 in optional communication with a database 58. In many cases, the server 56 and/or the database 58 may also perform the analysis on the image to make an initial determination of the identity of the object or item selected, particularly in cases where the computing capacity of the mobile device is insufficient to make an unambiguous determination of the selected or focused item or object.

In these implementations, the image is received on the server, and the server performs the analyzing to determine the identity of the object or item. The identity of the object or item may be assisted by analysis of the visualized SKU, barcode, or other item identifier, and data about the identity may be transmitted from the server to the mobile device.

Figure 2:
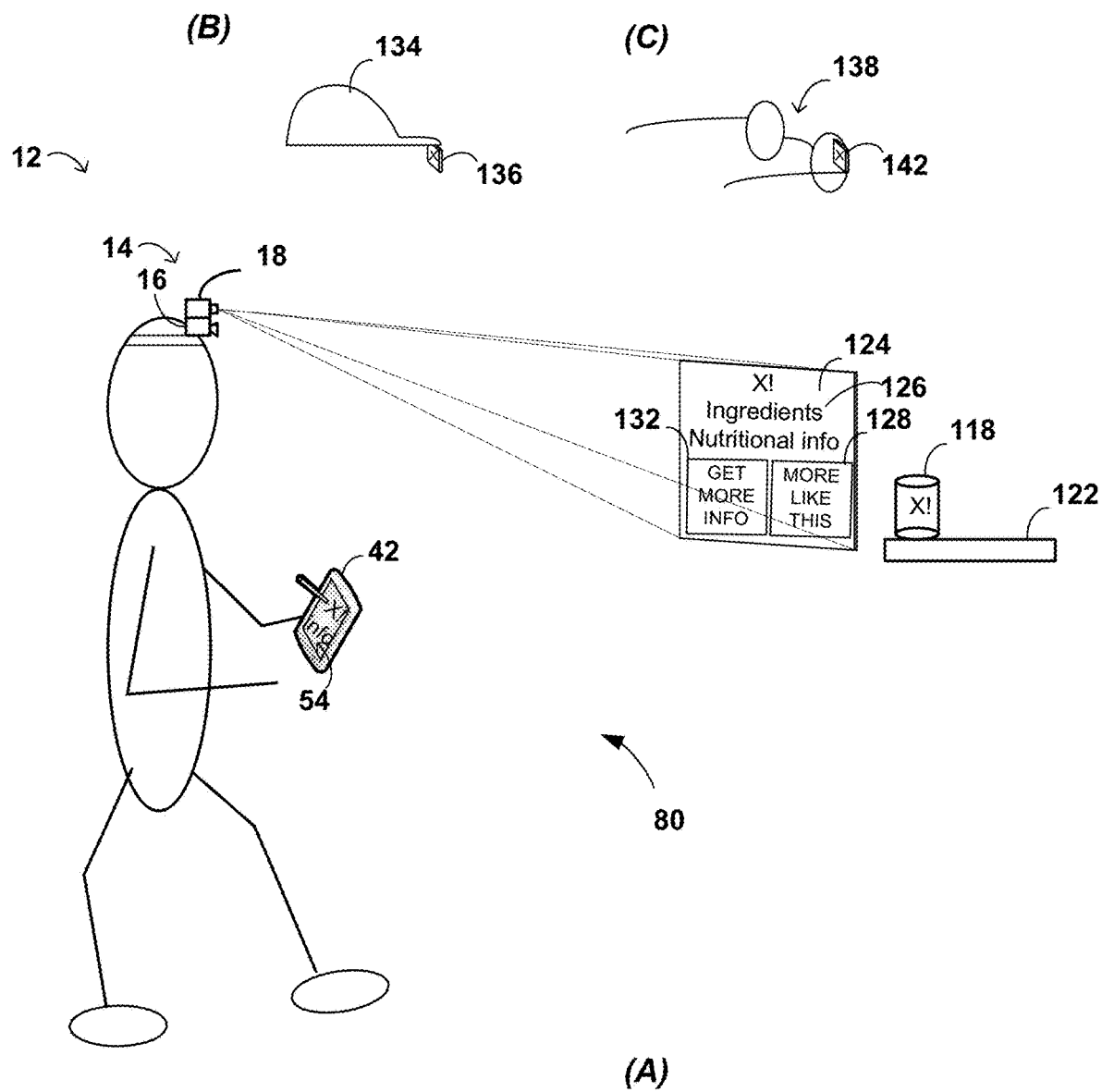
FIG. 2(A) is another schematic illustration of a user employing a system according to present principles to image, select, and highlight an object, as well as obtain additional information about the same.
FIGS. 2(B)-2(C) illustrate exemplary variations in how systems according to present principles may be implemented.
Figure 3:
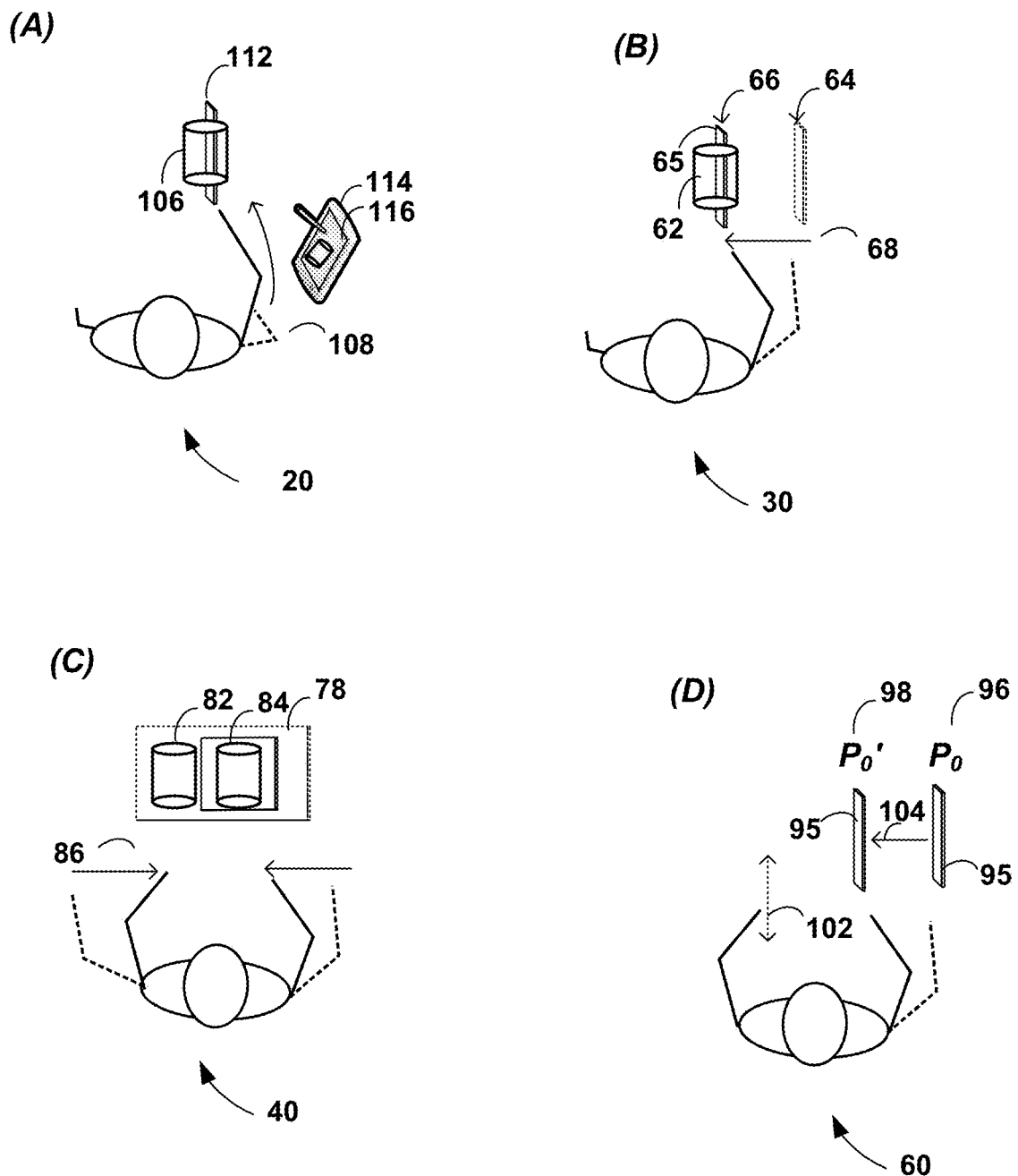
FIGS. 3(A)-3(D) are schematic illustrations showing exemplary types of gestures controlling a real world object user interface.

An indicator of the physical object may be displayed on a user interface 54 of the mobile device 42. Alternatively, the indicator may be projected by the projector 18 onto a surface viewable by the user 12 by the activation of the light source within the projector. The indicator generally provides information about the item, but may be simple or complex. In a simple embodiment, the indicator may show the name of the item. In a more complex embodiment, the indicator may provide the name, a description, and in some cases may further provide a menu by which a user may select additional functions. In particular, and referring to the system 80 of FIG. 2(A), a menu 124 may be projected which includes information about, in the case of a food item 118 on a shelf 122, ingredients 126, and other nutritional information. Virtual buttons may also be provided to enable additional functionality. For example, a button 132 may allow a user to obtain additional information about the item 118, and a button 128 may allow a user to see alternative similar items. It will be understood that for nonfood items, a different set of data may be provided, and different virtual buttons. User selection of the virtual buttons 128 and 132 may be by way of gesture detection, as will be described below, but generally entails detection by the camera of the direction the user is gesturing.

In lieu of a headband with device 14, the device 14 may be embodied by a drop-down device 136 from a hat 134 (FIG. 2(B)), or by a device 142 situated within eyewear 138 (FIG. 2(C)). Other variations will also be understood to one of ordinary skill in the art given this teaching.

In order to select a particular item, image analysis of a user gesture may be performed, and in many cases such will be video image analysis. For example, image analysis may be performed to determine an item at which a user is pointing, and such may be inferred by the system to be a selected item or object. In this example, the image analysis may follow the direction of a user's finger or hand, and may select the first item present. Variations will be understood, for example the first item present may be the first item which has its entire perimeter within the field of view, this requirement excluding other items on the side of the desired item to be selected, as well as excluding walls or rack or shelf components, and so on. Besides pointing at an object, it will be understood that a user may configure the system to provide other ways to select an object, as may be comfortable for that particular user.

As noted above, the selected item may be identified by a projected light on a surface, and may include an indicator of the item, such as its name, or even an image portrayed on a mobile device, which may be the image viewed by the camera or an image retrieved from a network source (having identified the selected object), or by other means, e.g., an audio recitation of the name of the product, e.g., in a headset such as a wired or Bluetooth headset, mobile device speaker, and so on. Audio feedback can be used in response to other conditions within the user interface as well, such as when focus is locked onto a particular object, or to indicate that the system has identified the focused object or that the system cannot identify the focused object.

Certain exemplary gestures are illustrated in FIGS. 3(A)-3(D). In the situation 70 of FIG. 3(A), by performing a pointing gesture 108 at an object 106, the object 106 is selected, and in the figure, a highlight 112 is then caused to be projected in a first direction onto the object 106. The highlight 112 may be caused to be projected by the activation of a light source within the projector. In this embodiment, an image of the object is also portrayed on a user interface 116 of a mobile device 114.

Next, in the situation 30 of FIG. 3(B), by performing a pointing gesture 68, the position of a highlight 65 is changed from a first position (or direction) 64 to a second position (or direction) 66, which thereby causes an item 62 to be highlighted. A selection gesture (which may be separated or combined with gesture 68) may then be employed to select the item 62. It will again be noted that besides changing the direction of a collimated beam, the steps may also be implemented by projecting a larger image, and moving the position of a highlight or target forming a portion of the image within the overall confines of the image. In the latter case the position of the overall image itself need not change, but the highlight is configured to be present on the physical object when the image is projected.

In a variation of this implementation, if a first object is selected, a gesture may cause the highlight to automatically move to an adjacent object, and in some cases to automatically select the same.

Referring to the situation 40 portrayed in FIG. 3(C), a detection zone 78 is illustrated which in some cases may be portrayed on a user interface viewable by the user. Where a detection zone is employed, the entirety of the field of view is not the subject of image analysis, but rather just a portion within the detection zone. By performing a pinching gesture 86, the size of the detection zone 78 may be changed and, in the figure, changing the size of the detection zone causes a single object 84 to be imaged rather than two objects 82 and 84. With an appropriate selection gesture, details about the object 84 may then be obtained and displayed. It will be understood that besides the size of the detection zone, the position of the detection zone may be adjusted by the user as well. In some implementations, once a single object is left in a detection zone, the system may automatically select the object. In enhanced implementations of this embodiment, the method may include detecting an object at or near a center of the image or detecting an object whose outline is entirely within the detection zone, and in this way determining the object to be selected. In a specific implementation, the computing capacity within the CAP device, and/or within the mobile device, may be employed to isolate an object in an image, but then the isolated object image may be sent to a server for actual identification of the imaged object.

Referring to the situation 60 of FIG. 3(D), a gesture 102 may also be defined, which causes a projected highlight 95 to reset from a first position ($P_o$) 96 to a new position ($P_o'$) 98. The new position $P_o'$ may generally be a default direction. This gesture provides functionality similar to that of raising a mouse from a mousepad in order to reset a position of a cursor. Similarly, a gesture may be provided whereby the position of the UI focus stays the same while the position or orientation of other aspects is changed, e.g., the position or orientation of the user, CAP, gesturing limbs, or the like. Ordinarily, without such a gesture, movement of these other aspects may cause the focus to change. Where the user performs such a gesture to allow repositioning of their limbs, the position of the UI focus, e.g., the projected beam, may stay the same for a predetermined duration of time, which time itself may vary based on the gesture.

Other user gestures will also be understood. In one implementation, the shape of a user gesture may be employed to determine certain actions. For example, instead of pointing at an object, an object imaged may be selected by the user tracing an "S" in the air around the object. The shape of the "S" is detected and OCR employed to discern the letter intended, and the discerned letter is then used to determine the action, e.g., via a look-up table.

Gestures may be employed to turn on or off the selection of an object. For example, a dim shimmering highlight may indicate a direction a beam is pointing at, similar to a mouse location. A brighter shimmering highlight may indicate that a particular item or object has been identified. A very bright shimmering highlight may indicate that a particular item or object has been selected. In lieu of increasing or decreasing brightness, different types of shimmering may be employed to indicate these distinctions, different shapes of highlights, and the like. In a particularly advanced implementation, the beam size may change (or size of the targeted portion within a divergent projected image) to encompass the entire perimeter or "seen" or "visible" area of a focused-on or selected item or object.

While certain ways to move a collimated beam (or target within a divergent image) have been described above, it will be understood that the same are only exemplary. A wide range of motions may be employed to support the movement of the highlight, e.g., arm motions indicating up/down/right/left movements, and the like. In all implementations, the user may move the beam manually, e.g., by moving his or her head in the case where the projector is headmounted. As noted elsewhere, such movement may also be compensated for in other implementations, whereby the user may move while the beam is stationary.

Figure 4:
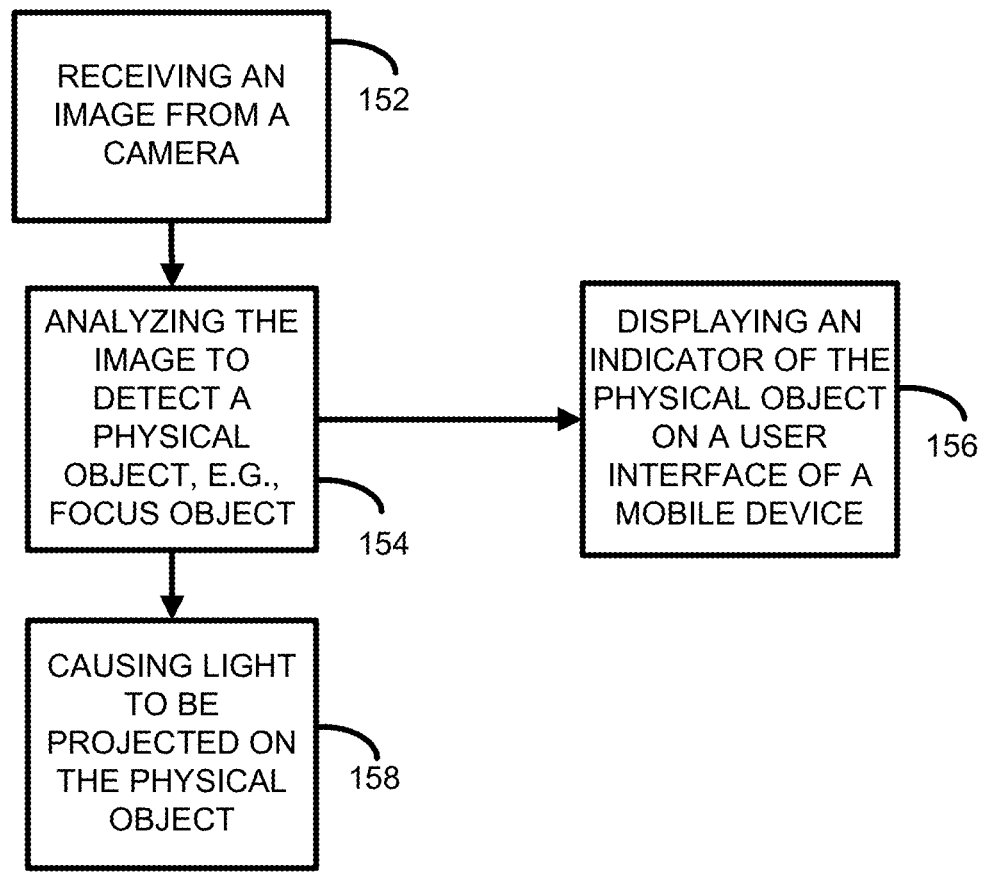
FIG. 4 is a flowchart of a method according to present principles.

FIG. 4 is a flowchart 140 detailing a method according to present principles. In a first step, an image is received from a camera (step 152). The camera may be a still camera but is generally a video camera such that the image changes as a user is walking or otherwise traversing through a store or other environment in which objects may be detected, imaged, analyzed, and highlighted.

The image is then analyzed to detect and identify a physical object (step 154). The analysis may take a number of forms, including detecting a barcode, SKU, or other objective identifier, and may also include detecting a shape or color of product packaging or labeling in order to perform the identification.

The object or item may then be highlighted (step 158). The highlighting may be as accomplished above. The highlighting may indicate just a direction of the projected beam, like a mouse cursor, or may also indicate that an object has been identified and/or selected. Use of a divergent beam with a target or highlight is analogous. An indicator of the physical object may also be displayed on a user interface of a mobile device (step 156).

Figure 5:
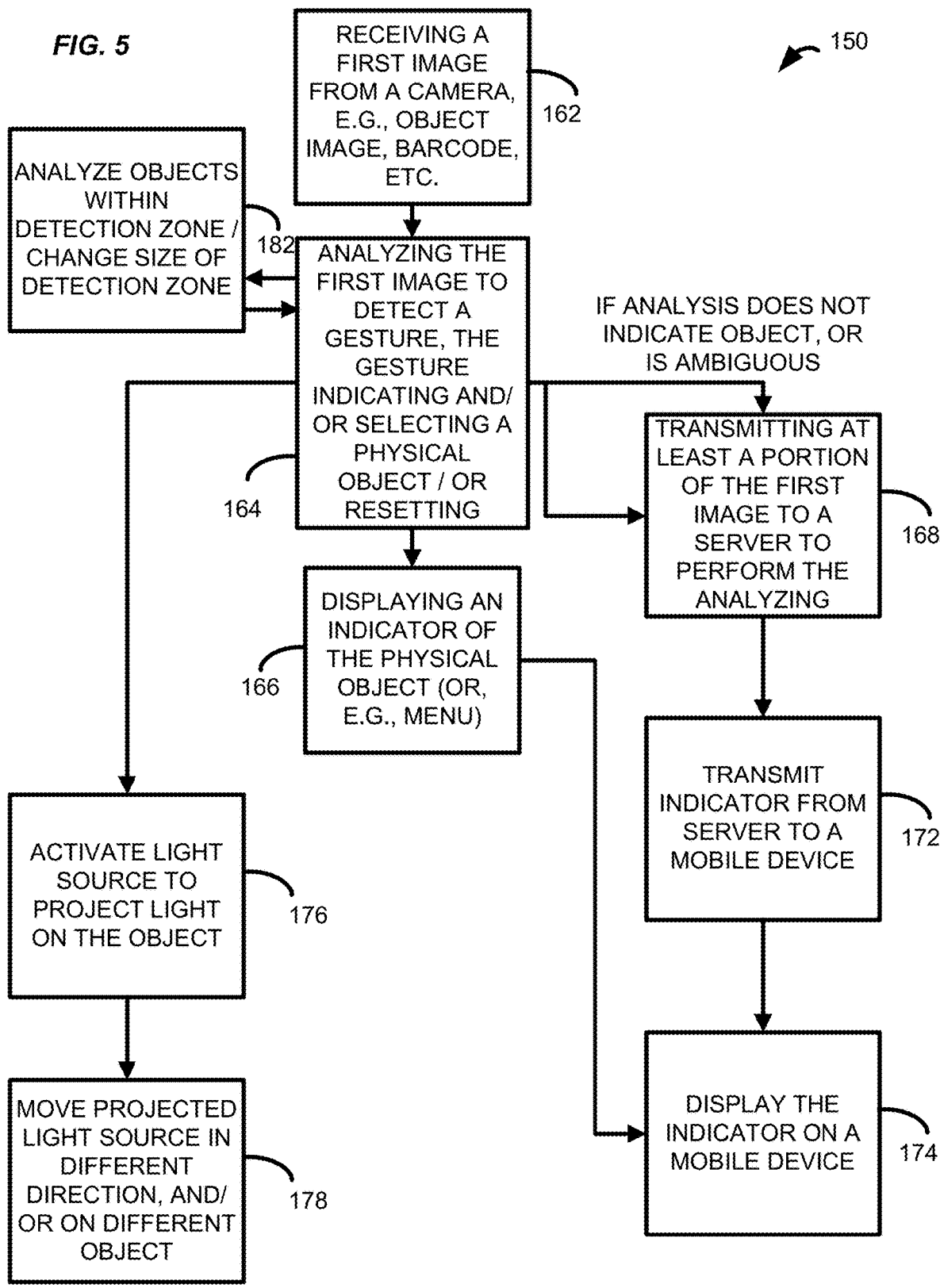
FIG. 5 is a flowchart of another method according to present principles.

The flowchart 150 of FIG. 5 shows a more detailed implementation of the method. In a first step, a first image is received from a camera (step 162). This step is analogous to step 152 of FIG. 4. The first image may then be analyzed to detect not just objects in the video stream but also a user gesture (step 164). The gesture may indicate a number of actions, including an object to be selected, a detection zone (for example a user may draw a rectangle in the air to indicate a desired detection zone which is then implemented in the camera and projection system), a resetting of a projected highlight to a default direction, and so on. An indicator may then be displayed of the physical object (step 166), such as via projection of information about the object or a context-sensitive menu on an adjacent surface or wall. This step may also include displaying an indicator on the mobile device (step 174). This step may also include projecting an indicator on the object itself, to indicate its selection.

Certain steps above are now described in more detail. The step 164 of analyzing may include analyzing objects within a detection zone (step 182), and/or changing the size of the detection zone to isolate one or more objects. In an example where multiple objects are targeted or within a detection zone, a user may define the detection zone such that several types of spaghetti sauce are within the zone, and the system may then perform a comparison of the varieties of spaghetti sauces, including nutritional information and/or pricing. The system may allow for defining several detection zones to accomplish the same purpose, e.g., a user may outline several different objects, or point to several different objects, to perform a comparison of the same.

The analysis step may be performed within the CAP device 14, although in many cases such may be more advantageously performed on the mobile device or on a server. Generally the greater computing capacity of the server allows for more rapid image analysis, as well as the rapid obtaining of information about the item (or items to be compared). The server may also access far more data about the object or comparative/competitive object data as compared to what could be stored locally on the mobile device. Consequently, if local analysis does not identify the object or is ambiguous, at least a portion of the first image (or the entire image) may be transmitted to a server to perform the analyzing (step 168). An identifier of the item may then be transmitted from the server to the mobile device (step 172), as well as any additional information about the item. Alternatively, once the identity of the item is known, the mobile device may search for additional information. An indicator of the item may then be displayed on the mobile device (step 174). The indicator may also be projected as described above.

To indicate a current focus of projection, or a selected object, the light source within the projector may be activated to project light onto the object, or to move the light onto the object (step 176), with displayed highlights as have been described. The light source may then be moved in a different direction, or onto a different object (step 178), as dictated by the needs of the user. As noted above, moving the light source may be performed by the user simply moving the projector "manually", by moving their body, or by the use of micro motors or other servomotors within the projector, in response to gestures by the user or commands within an application operating the projector.

As the projector is highlighting objects imaged by the camera, it is necessary that the projector be calibrated to the camera. In some cases, the camera and projector may be in a fixed positional relationship, and in this case the calibration may be required only occasionally, e.g., upon the mounting of one to another, if at all. In other cases, and particularly if the camera and projector are not in a fixed relationship, such as where a mobile device is employed as the camera (or even in some cases as the projector), then the step of calibration is particularly important and may be performed continuously or on a frequent basis, e.g., every second or few seconds (generally, as often as the positional relationship between the projector and camera changes). Where a mobile device has a projector functionality and both functions are performed by the mobile device, then the situation is as above with a fixed relationship.

Calibration steps generally include projecting a beam of light in a known direction from the light source, and then detecting the location of the beam of light using the camera. By detecting the location of the beam of light using the camera, the orientation of the projector can become known relative to an axis or plane of a lens of the camera. Where the projector projects a divergent image with a portion being a target, the camera can detect the location of the target. In this case, the camera can also in some implementations detect the extent of the projected image, thereby further improving the calibration.

Figure 6:
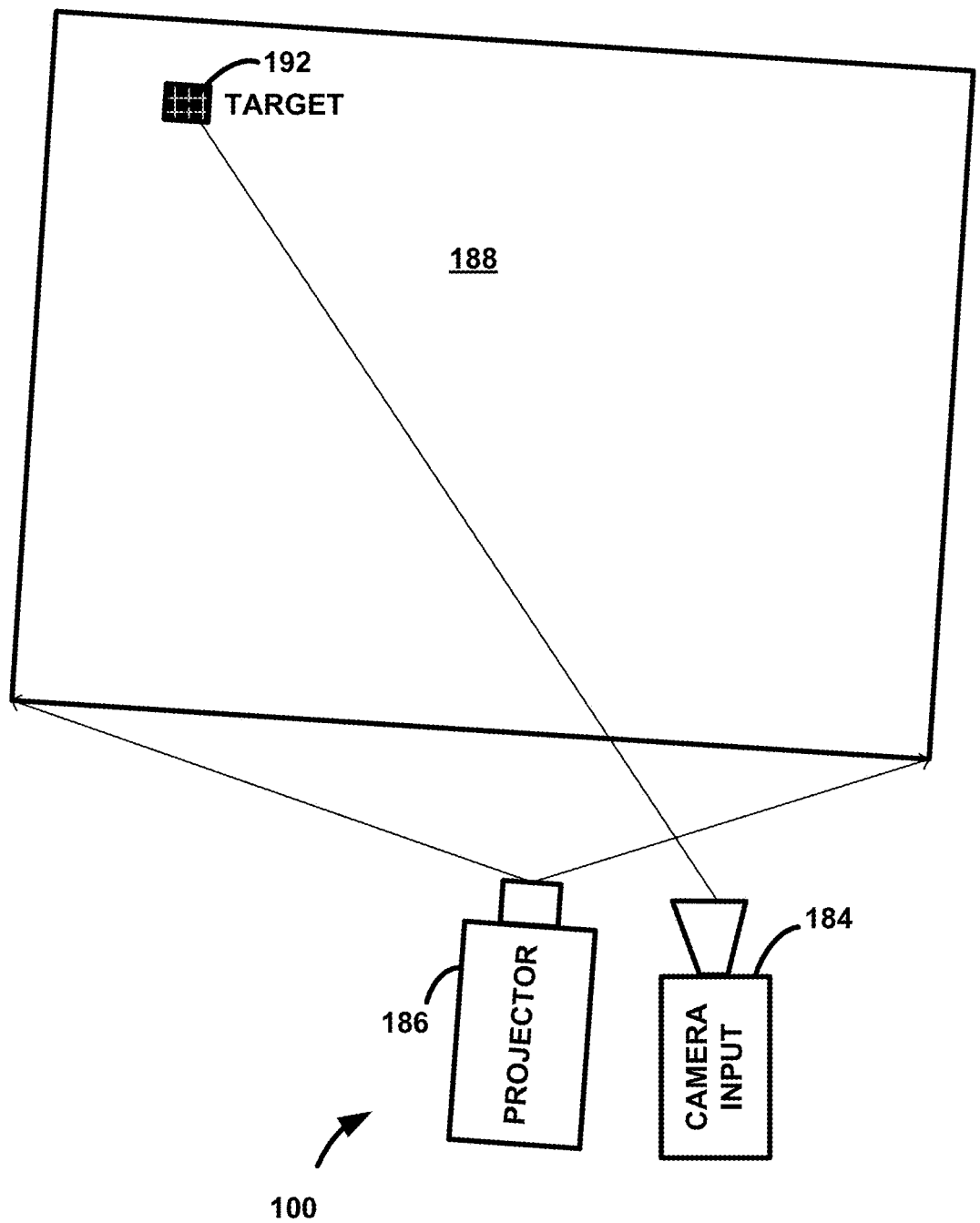
FIG. 6 shows an exemplary calibration technique which may be employed with systems and methods according to present principles.

Such a calibration is illustrated by the system 100 of FIG. 6. In this case, the CAP device includes a projector 186 and a camera 184. The projector is projecting an image 188 having a portion constituting a target 192. The camera 184 is shown detecting the target 192, and the position of the target 192 relative to the camera 184 can then be employed to determine the location of the projector 186 relative to the camera 184. A similar calibration will be understood for cases where a collimated beam is projected, rather than a divergent image.

Figure 7:
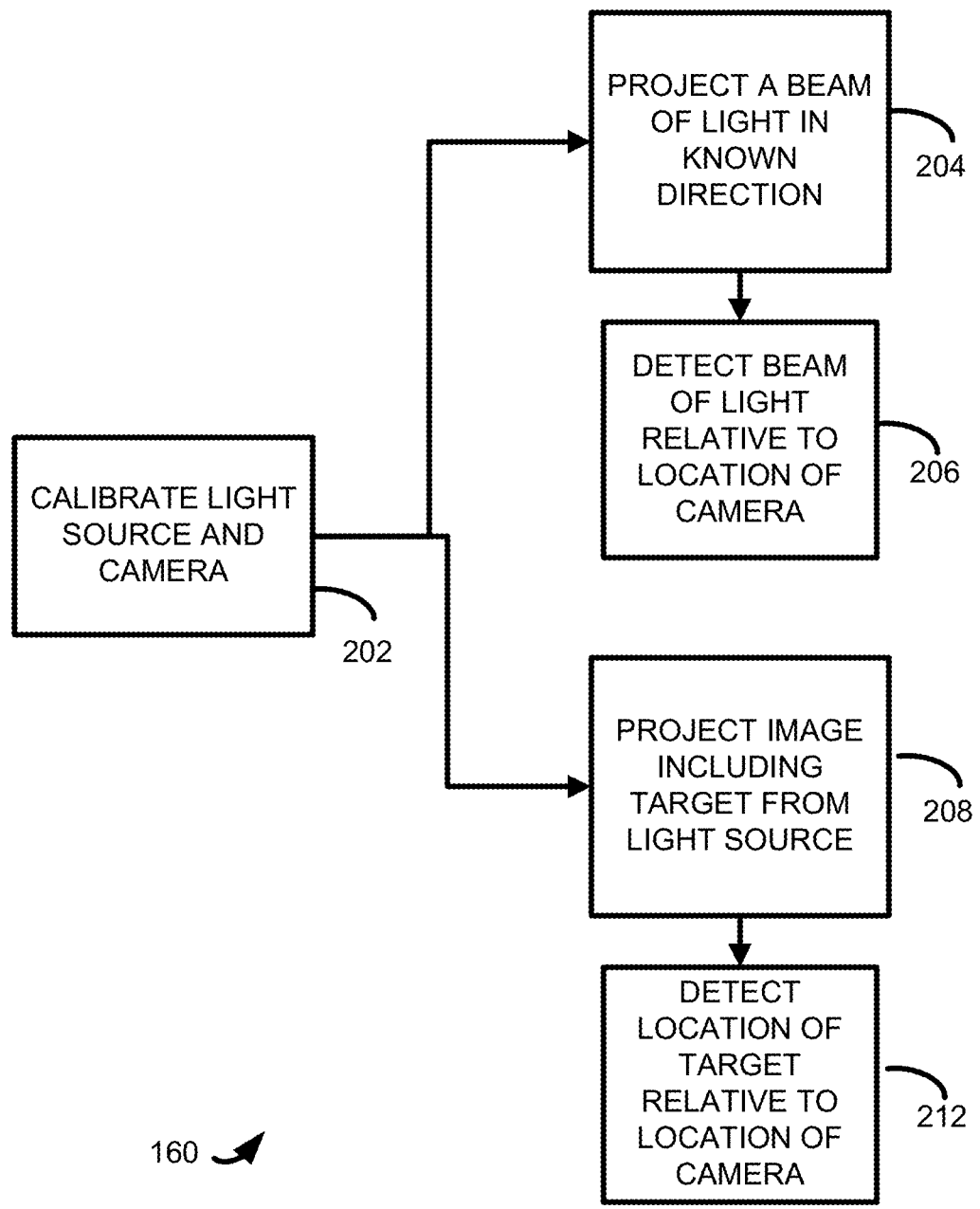
FIG. 7 is a flowchart of yet another method according to present principles, in particular showing a method for calibration.

FIG. 7 illustrates a flowchart 160 of a method of calibration. In a step of calibration (step 202), a collimated beam may be projected in a known direction (step 204), and the beam may then be detected relative to the location of the camera (step 206). In another implementation, an image is projected including a target from the light source (step 208), and the target location is detected by the camera (step 212), thus calibrating the position and orientation of the camera relative to that of the projector light source.

It will be understood in both situations that the camera is detecting the position of the beam or target on the object or item, and thus the distance of the item from the camera and the distance of the beam from the camera will be the same, and will thus scale up or down depending on the position of the user relative to the item or object. In other words, the calibration may not depend on the distance between the user and the item. This is particularly true when the camera is adjacent the projector.

In other configurations, where there is a significant distance between the camera and the projector, the difference in angle to the same object between the camera and the projector can differ significantly based on how far away the object is. In such a situation, the camera image may require continuous monitoring to ensure that the projector is in the correct direction for the current distance to the object. Another option would be if the system included a way to measure distance, as noted above, e.g., multiple cameras to enable 3D reconstruction, range finders, or the like, then the offset can be calculated for the distance once the system is calibrated. If the camera and projector move relative to each other, then the system may generally constantly monitor the video to determine the alignment of the projected light with the real world and make corrections as that alignment drifts.

Referring to FIG. 8(A)-8(B), a gesture control according to present principles may also be employed to control one or more aspects of a CE or other computing device, by having user gestures translated into various control functions. In the situation 110 of FIG. 8(A), a CE device 214, e.g., an IPTV, is being controlled by a user who is performing a gesture 216. The gesture 216 may be any number of gestures, and may be translated to a respective number of control functions for a given CE device. For example, in many implementations, an initial gesture may be for selection or determination of a CE device for which controls are to be issued. Control functions may then be performed on the determined or selected device. For example, a user making an upward gesture may cause a "channel up" function to be performed. A user making a downward gesture may cause a "channel down" function. A user gesturing at their ear may cause the volume to rise. Other gestures will also be understood given this teaching. For example, gestures may be employed to select content. Gestures may further be employed to place content items on a wish list or playlist. It should be noted that such functionality described above is significantly greater than simply causing isolated acts based on movement, as the above includes, e.g., both device selection as well as device control. Relatedly, in one implementation the system detecting the user's gestures is separate from the device being controlled. In this way, commands are relayed to the device being controlled by the system that detects the user's gestures—the device being controlled is simply a passive recipient of commands. This may be contrasted with certain videogame consoles that include motion input. In such consoles, the game system is interpreting the user's gestures and responding to anything it can parse out as a command. It lacks an independent intermediary system between the user and the device being controlled. This feature also allows the independent intermediary gesture detection system to control multiple devices. In particular, some user gestures can be interpreted as commands to be routed to one device, while other user gestures can be interpreted as commands to be routed to a second device. Moreover, some gestures can be interpreted as commands to control the gesture UI itself. In this way, a degree of independence is provided between the gesture UI and the devices being controlled that is not present in game consoles.

Gestures may be employed to perform actions with respect to a number of CE devices as well, especially those connected on a network. For example, and referring to FIG. 8(B), a user making a swiping or dragging gesture from one CE device to another, e.g., a swiping gesture 224 from CE device 218 to CE device 222, may cause a content item which is playing back on the CE device 218 to also play back on the CE device 222, or to play back on the CE device 222 instead of playing on the CE device 218. The content item may be caused to play back in a synchronized fashion, e.g., starting at a point on one device where it left off on the other.

Whether the gesture is with respect to one device or many, the same may be discerned or identified by analysis of a visual image of the user gesture, e.g., from a camera. A user movement may be determined from the received image and the same compared to a plurality of basis user movements in a library or in a look up table to determine which of the plurality is intended by the user gesture. Once a basis user movement is found, the control function assigned to that user movement is then applied to the desired CE device.

It is noted in this regard that the device generating the image being displayed by a display device may not be the display device, such as when a TV displays the output of a cable box, disc player, game console, or computer. In such a case it may be more natural for the user to gesture towards the displayed image they wish to control, even though the location of the image source device that they are actually controlling may be somewhere else. In this case implementations of the disclosed systems and methods further perform a step of relaying the user's commands to the appropriate device, e.g., the cable box, disc player, game console, computer, or the like.

Figure 9:
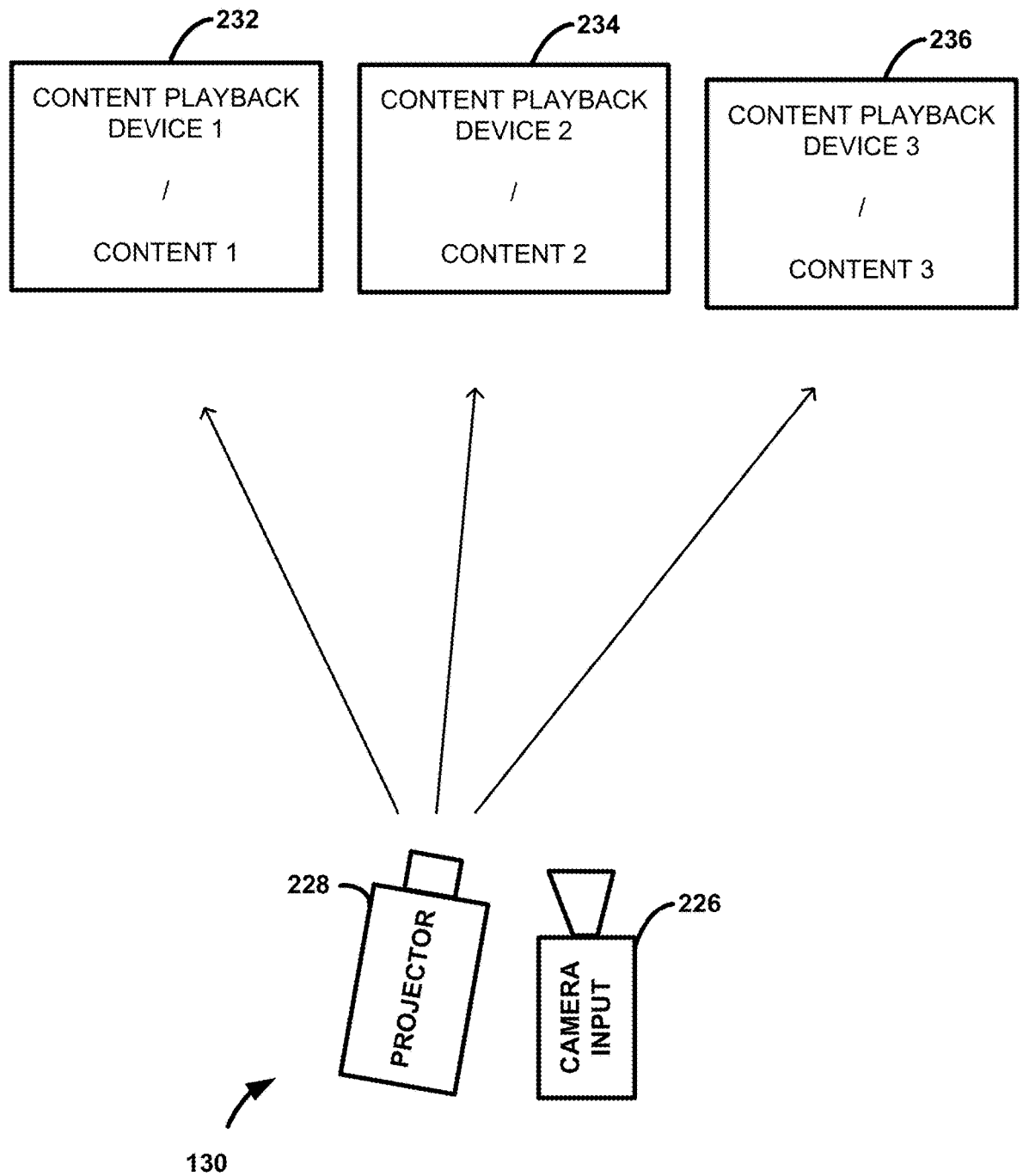
FIG. 9 schematically illustrates gesture control of CE devices, and in particular using gestures to select a CE device, or to select a content item, e.g., for playback.

In yet another implementation, as illustrated in FIG. 9, a CAP device 130 for controlling a CE device may include a projector 228 and a camera 226. The projector may be employed to display images pertaining to a number of content playback devices (illustrated in the figure by content playback devices 232, 234, and 236) which a user may gesture towards in order to select a particular content playback device for playback. The figure elements also illustrate that, if a device that can play content, e.g., radio or TV, is already in focus, then the images of content playback devices may be replaced by images pertaining to various portrayed content items which may also be the object of selection by the user. The same may show the title of the content item, or even a short trailer or stills from the same. A user gesture, e.g., pointing, can select the content playback device or content item by pointing at a given image, and having the camera detect the image which is being indicated by the user. Other alternatives for user selection will also be understood. For example, and as shown above in FIG. 8(B), a swiping gesture may cause an item of content to be synchronized between two devices.

It is noted that in a system in which multiple content playback devices are situated in a common area, e.g., within the same room, a user may gesture towards, i.e., point at, a physical content playback device and the camera may cause the selection of the same for playback. In either case, the image displayed by the projector 228 may be replaced by a menu system which would allow a user to browse and "drill down" to a desired content item for playback.

Figure 10:
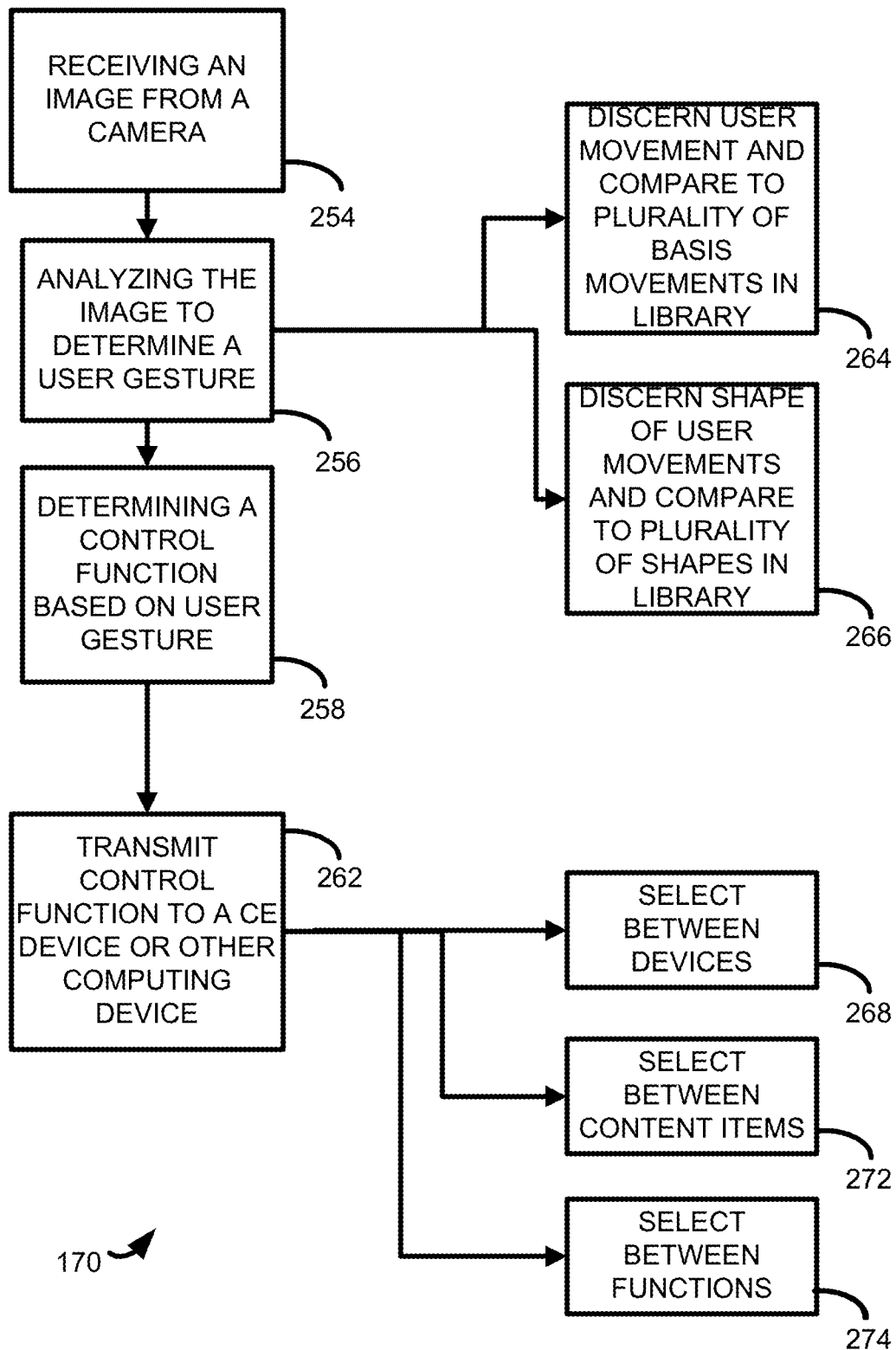
FIG. 10 is a flowchart of yet another method according to present principles, in particular showing a method for control of consumer electronic devices.

FIG. 10 shows a flowchart 170 for a method of gesture control of a CE device. In a first step, an image may be received from a camera (step 254). The image may then be analyzed to determine a user gesture (step 256). In so doing, a user movement may be discerned and compared to a plurality of basis movements in a library or lookup table (step 264). In another implementation, the user gesture may be determined by discerning the shape of a user movement and comparing the same to a plurality of shapes in a library (step 266). For example, if the user draws an "R" in the air, such may be discerned to be the letter "R".

A control function is then determined based on the user gesture (step 258). For example, where the user has drawn an "R" in the air, and the letter "R" has been discerned as the user gesture, a control function of, e.g., "RECORDING" may be determined. The control function is then transmitted to a CE device or other computing device (step 262). For example, the control function may cause one or more devices to be selected (step 268), a particular content item to be selected (step 272), and other functions may also be selected (step 274).

The way in which the control function is transmitted may vary, but the same may include IR remote control codes, Bluetooth®, network connections such as WiFi, LAN, or the same may be directly addressable in a proprietary manner. The same may also be addressable through a proxy, allowing a device that is not addressable from the network to be controlled.

Variations of the above CE device gesture control will also be understood. For example, while a camera has been described above for detecting gestures, gesture detection and/or determination may also be provided by other sensors, e.g., a virtual reality glove or headset, or motion or position sensors operated, controlled, or otherwise moved by the user, e.g., motion sensors disposed on a smart watch or ring worn by the user. Other such devices will also be understood given this teaching. In these cases, the sensor-detected-gesture is associated with an object visualized by the camera.

Figure 11:
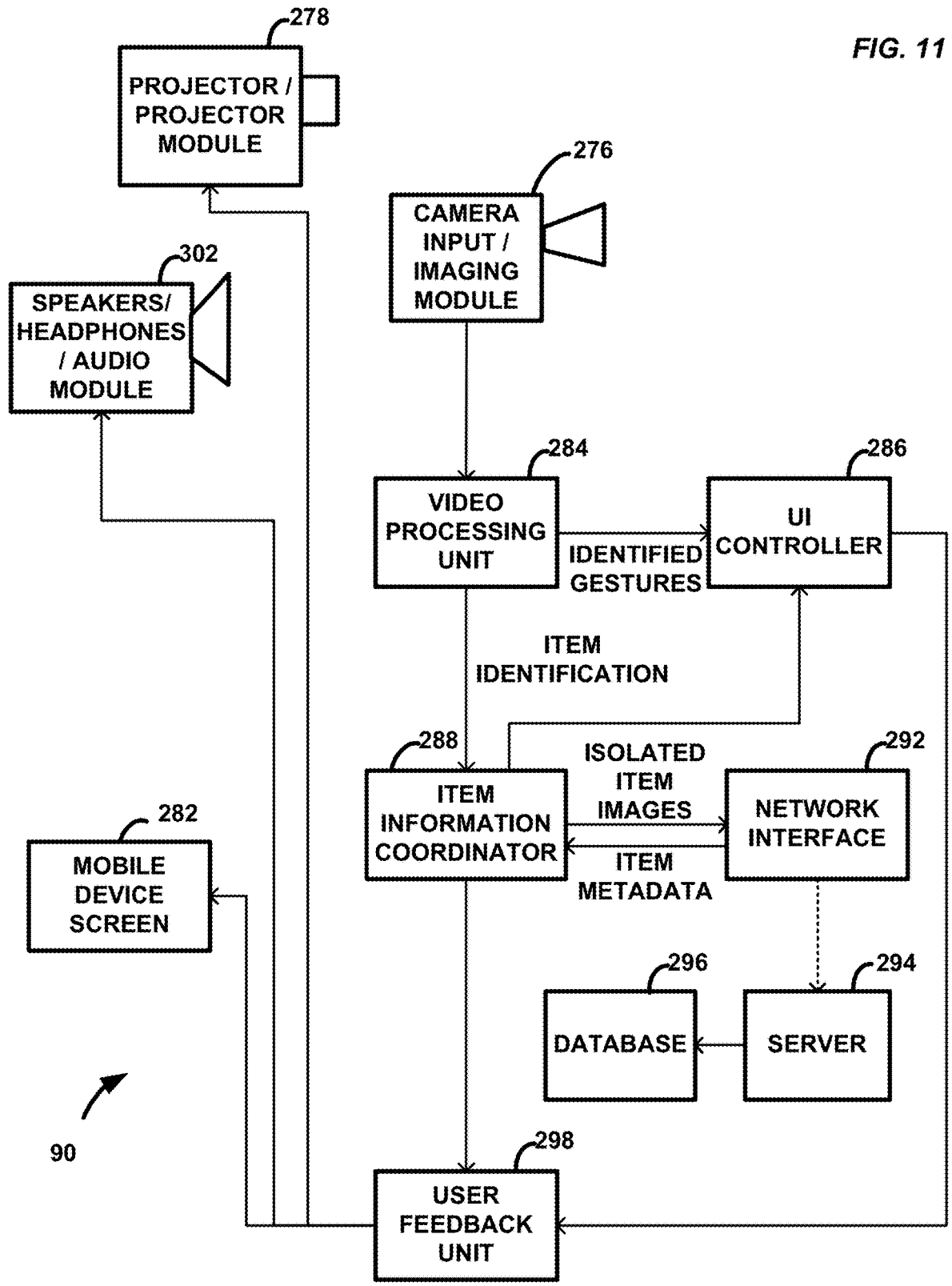
FIG. 11 is a logical diagram showing various elements in an exemplary system according to present principles.

FIG. 11 shows an exemplary system 90 according to present principles. Certain elements have been described above, including a projector 278, a camera 276, and a mobile device 282. Speakers or headphones 302 may also be employed to provide audio cues to a user, e.g., audio indicators of objects and items, or data and information pertaining thereto. The image from the camera 276 may be sent to a video processing unit 284 which may be employed to discern gestures and items. Aspects about gestures may be sent to a UI controller 286 which then functions as an input for a user feedback unit 298. Images and other aspects about particular items may be sent to an item information coordinator 288 which may itself identify items or may isolate item images and send the same through a network interface 292 to a server 294 which in turn may access a database 296. Retrieved item information, e.g., identification in the way of metadata, is then returned from the network interface 292 to the item information coordinator 288.

The user feedback unit 298 may in turn provide information about the item, e.g., indicators, to the projector 278 for projection on a surface, to the speakers or headphones 302 for playback to the user, or to a screen on the mobile device 282.

Additional variations and implementations are also possible, including combinations of the above features. The systems and techniques described above are not limited to the examples described. For example, while object highlighting has been described in the context of a projected light, a projected image with a target, or as displayed on the mobile device screen, the same may also be implemented within a headmounted displays, e.g., within eyewear, where the target is disposed on a screen viewable by the eyeglass wearer or as a target within a lens of the eye glasses. In this way, a viewer may be made aware of which object is selected by where the target appears on the lens of the eye glasses, e.g., generally in a direction marking the location of the selected object relative to the image viewed through the lens. The object may be indicated to be selected in other ways, e.g., by the name of the object being displayed on the eye glass screen or lens, or in other fashion. Other implementations of the system and method include configuration as part of a smart watch, cell phone, or the like.

Systems and methods according to present principles may be applied as an advanced "dash cam" or "helmet cam", allowing video to be taken of a user's surroundings but where the video is in some way selected by a user, using a combination of gestures and/or projections, so as to result in a recorded video with special emphasis on that which the user intends. Multiple cameras may be employed for this purpose, if the device supports such.

While a substantial portion of the disclosure is related to the experience of shopping, it will be understood that the system and method may apply to other applications as well. For example, while traveling, experiences may be enhanced by the systems and methods according to present principles. For example, a nature hike may be significantly enhanced by retrieving information about flora and fauna seen during the hike. Users may take advantage of the systems and methods according to present principles in the home, e.g., by controlling CE devices or preparing meals in a kitchen, or in the office, e.g., turning on projectors, transferring presentations or other images/videos from a laptop to the projector, causing documents to print or files to be transferred, turning lights on/off, and so on.

The systems and techniques may also be applied to viewing objects in other contexts, such as in online environments, social networking environments, and the like.

While the described systems have generally been with respect to systems employing visible light, the same may employ other wavelengths, especially in the case where the display is implemented within eyewear. In this case, the lenses of the eyewear may convert the reflected light into a form visible to the user. A benefit of this implementation is that other shoppers are not distracted by the projected light.

Certain systems and methods described above have employed activation of a light source as part of a step of projection. It will be understood that this phrase is used generally, and may also apply to situations where a light source is always on but is masked by darkened pixels. Modification of the pixels allows light to pass through, and such technology may advantageously be employed in the systems and methods described above.

In another variation, while the above description has concentrated on systems where a visual images of an object and a gesture are obtained using a single camera, multiple cameras may also be employed, e.g., where a first camera is used to obtain and transmit a first image including an image of a physical object, and a second camera is used to obtain and transmit a second image including an image of a user gesture.

Systems and methods according to present principles may advantageously employ aspects of machine learning to enhance and improve their operation over time. For example, if a common action for a user is to arrive home and to adjust their thermostat to 70°, the system may learn that such is a desired action, and may learn that if the user points at the thermostat when they arrive home, 70° would be a likely setting.

Other variations are also possible and will be readily apparent to those of skill in the art in light of this new disclosure.

The above description indicates systems and methods according to present principles in which a camera may interact with a display, e.g., of a mobile device or a projection system, to indicate items, products, or objects. In this way, information or data is received by a computing environment and employed in determinations, where the information or data is at least in part gleaned from a user's interaction with the real world. The below description describes ways in which such systems and methods may be implemented to provide specific and additional functionality to a user.

Figure 12:
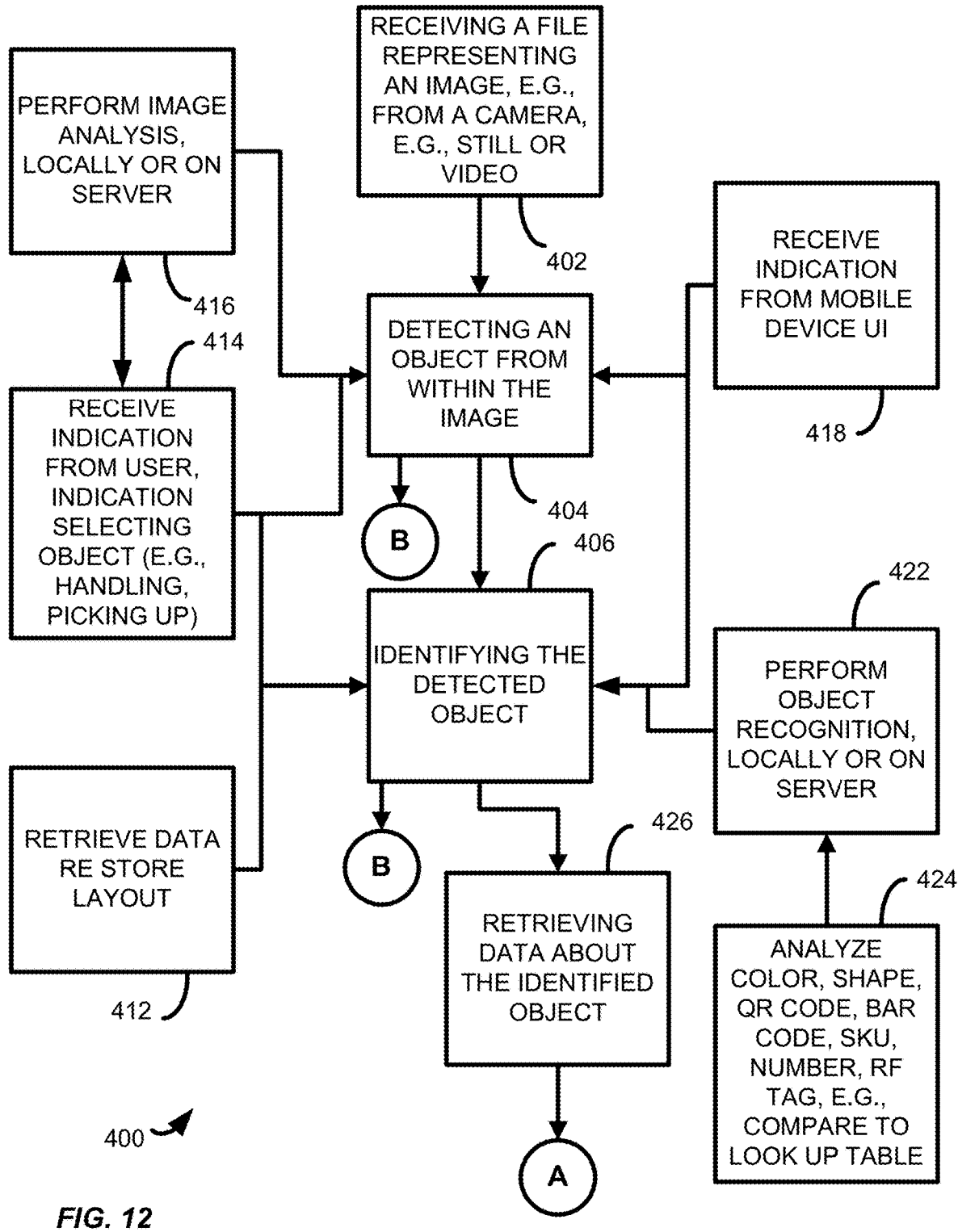
FIG. 12 is a flowchart of an exemplary embodiment according to present principles.

Referring to the flowchart 400 of FIG. 12, in a first step, an image is received by the system (step 402). An image is generally received by the system by continuously or periodically (or on another basis) receiving visual data about the environment of the user. The camera generally moves with the user, and thus may be headmounted, wearable, or attached to or carried by the person in some other manner. In a specific implementation, the camera continuously receives data about nearby products, and determines products to be illuminated, e.g., by comparison to what products may be of interest to a user.

In particular, a file may be received representing an image, and the file may be in a number of known image formats. The file may be a still image or may be in the form of video. The reception of the file, and subsequent processing, may be performed on the CAP device, on a mobile device, on a server to which the file is transmitted or the like. In this sense, the step of "file was received" is broad, and can encompass a sensor on the camera (e.g., on the CAP device) receiving the image and transmitting a file corresponding to the image to another portion of the CAP device, all the way up to a sensor on the camera on the CAP device receiving the image and transmitting a file corresponding to the image to a mobile device and/or server for analysis.

In a next step, an object is detected from within the image (step 404). This step may be performed in a number of ways, and may be assisted by a number of aspects. This step may be performed by the mobile device, by the CAP device, or by an external server analysis (and therefore detecting an object may include causing detection of an object). In a specific implementation, image analysis is performed on the received image to determine an object within, e.g., either locally or on a server (step 416).

In another implementation, an indication may be received from a user, where the user indicates the object selected or to be selected via a gesture, e.g., pointing, picking up, handling, a combination motion of picking up and performing a gesture, or the like (step 414). The system may continuously monitor images to determine when a user is indicating an object in this way. Such gesture determination is described in greater detail in the description above with respect to FIGS. 1-11. Steps 414 and 416 may be combined in some implementations, and may further be combined with other steps described herein, depending on context. In another step of detecting an object from within the image, an indication may be received from a mobile device user interface (step 418). For example, an application within the mobile device (or running on the server) may call out a number of potential objects in the imaged scene, e.g., by outlining, and may portray the same on the mobile device user interface. The user may then be invited to select a particular object by pressing the touchscreen at a location within the outline of the desired object. Alternatively, a list comprising a number of cropped portions of the image may be provided, each cropped portion indicating a potential object for selection. The user may then select from the list. In another implementation, where the CAP device has created an image comprising one or more objects, a mobile device camera may be employed to "localize" the image to a particular object of selection, e.g., by taking an image with the mobile device camera of a desired object to supplement that of the CAP device. In yet another implementation, a light from a mobile device may be employed to provide extra illumination on a desired object, and the object may then be detected by the CAP device by detecting the object with the extra illumination. Other ways of using a mobile device in combination with a CAP device to detect objects from within images will also be understood. And as noted in the description above, the camera within the mobile device may also be that which creates the initial image from which an object is detected, optionally with the camera in the CAP device performing the functions noted above with regard to steps 414, 416, and 418 (i.e., with the camera roles reversed).

A next step is to identify the detected object (step 406) (which may include causing identification of an object). The identification can be performed in a number of ways, including certain ways described above with respect to detection. For example, the identification can occur by the step of object recognition analysis, performed locally or on a server (step 422). In such object recognition analyses, various aspects of a detected object are employed to determine what the object is, e.g., its identity, its product name, and the like.

In these analyses, the detected object may be computationally examined for its color, shape, or for an identifying code such as a barcode, SKU, QR code, or the like (step 424). For example, various soft drinks are recognizable by their shape and the color of their packaging. A brand name and/or logo may also be employed in identifying an object. The increasing resolution of cameras (and decrease in their size), whether implemented within a CAP device or a mobile device, can allow better resolution of the identifying codes noted above. The identification of the object may then be determined by comparison of the discerned or recognized code, shape or color to a lookup table of such codes, shapes, colors, or the like.

Certain steps disclosed above in the detection step may also be employed in the identification step. The identification may be assisted by the user, who by a gesture may provide data which helps to classify or categorize the object (step 414). For example, a user performing a drinking gesture with regard to a product may quickly narrow down the number of potential categories or objects to which a selected object may be associated. In the same way, a number of potential categories or objects may be displayed on the mobile device, and an indication may be received by a user selecting a particular one as the selected object (step 418).

As another type of information or data which may be employed by the system in the identification of objects, data may be received or calculated or otherwise determined about a location within the store in which the user is situated (step 412), if such data can be determined, e.g., by GPS, by data transmitted to a mobile or CAP device about store layout (which may be a service provided by the store), by triangulation afforded by WiFi transmitters, RFID, or the like. In this way, data may be received by the CAP or mobile device about the sort of products or objects currently surrounding a user. This data may be employed to rapidly narrow down the pool of potential objects a user may be indicating, thus enabling faster, more convenient, and more accurate identification of a detected object.

It will be understood that certain steps described above may be combined. For example, the detection and identification steps may be combined, or run concurrently, especially where only one object is portrayed in an image.

It is also noted that, in a variation, once an object has been detected and/or identified, the information about the object may be at least temporarily maintained at the server or mobile device. In this way, so long as the user is currently manipulating the object, or is still on the same shopping trip, the server or mobile device need not analyze, or cause the analysis of, the object again. Variations will be understood, e.g., the server or mobile device may maintain the information for 15 minutes, 30 minutes, or may use some other measure of duration as a user may desire.

Figure 20:
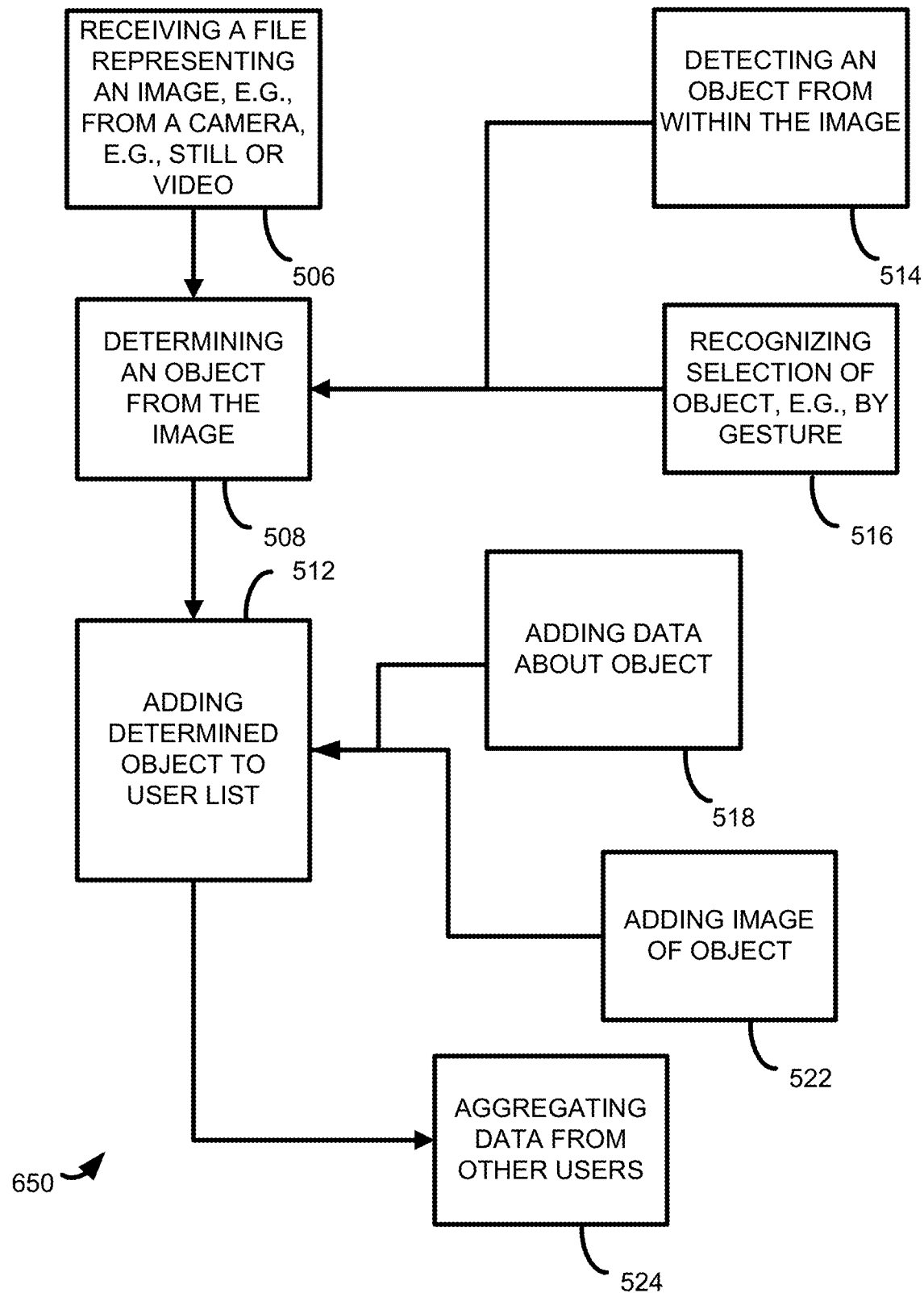
FIG. 20 is a flowchart of another exemplary embodiment according to present principles.

Data about the detected and optionally identified object may be stored in a user profile as an object of potential interest to the user. For example, when the user picks up an item in a store and reads the label, the system can record that fact in the user's profile. In a particular implementation of such a method, a use case of the real-world object user interface may allow the user to create a wish list or other list of items. For example, if a user gestures towards an almost empty tube of toothpaste in their bathroom, a notation to purchase toothpaste may be added to the user's shopping list, e.g., either of the same quantity and type or a more general notation. Similarly, a user might make a gesture after selecting or interacting with an object, such as following the act of picking up the product to read the label. The gesture may indicate a favorable opinion, e.g., such as to put the item on the wish list, or a negative opinion. In this way, the user's profile may be updated with appropriate data. The data may pertain not only to a particular product, but also to indicate on the user profile that gestures following "picking up" or handling motions are likely to indicate information likely to be employable in selection algorithms. Additional details of such implementations are described below in connection with FIG. 20.

Figure 13:
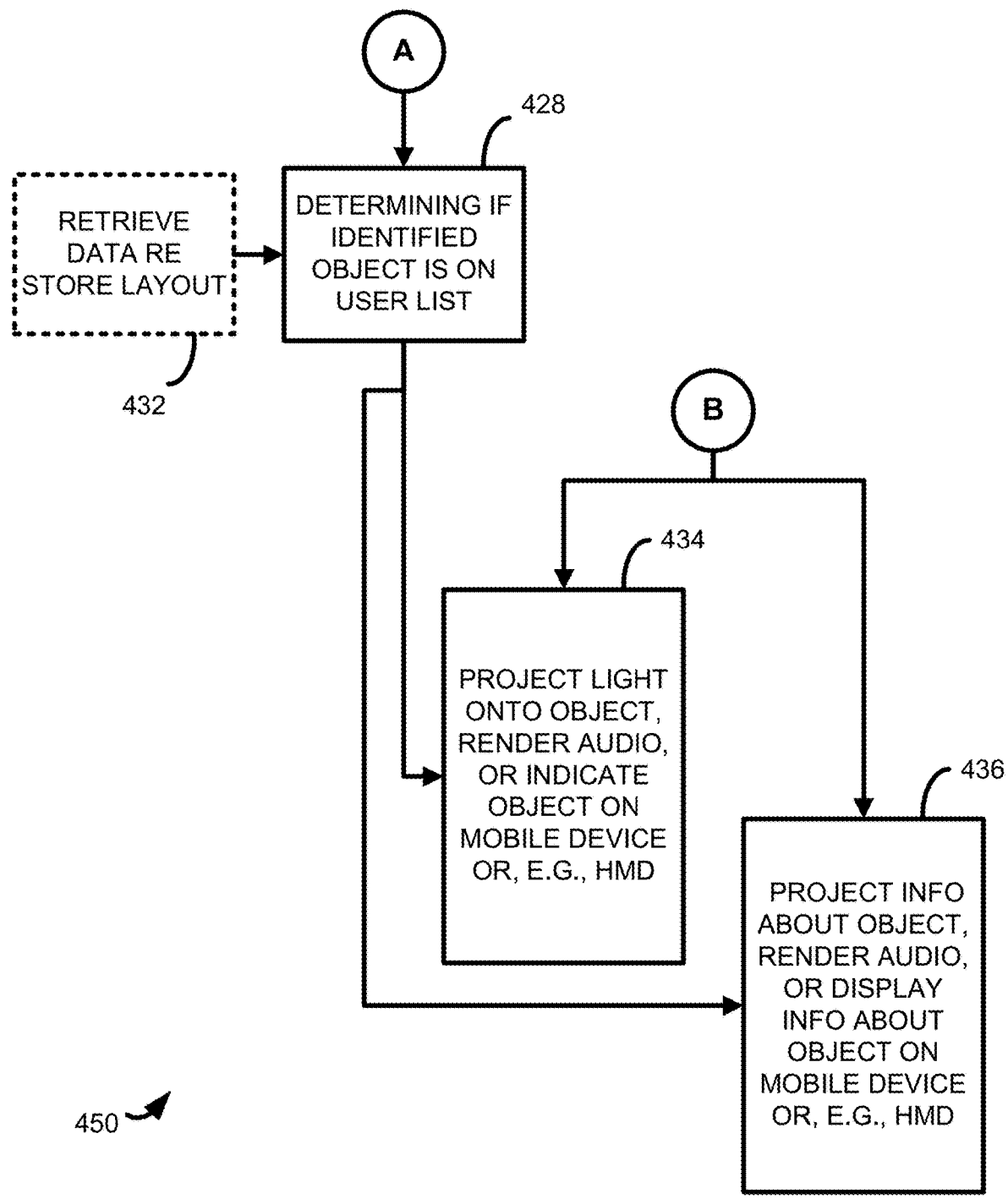
FIG. 13 is a flowchart of another exemplary embodiment according to present principles.

Once an object has been detected and optionally identified, flow may pass to the point "B" indicated on the flowchart 450 of FIG. 13, in which light is caused to be projected onto the object, audio is rendered about the object, or an indication of the object is provided on a mobile device or on another display, e.g., a headmounted display (step 434). Where the object has not been identified, the rendered audio or indication may provide less information, e.g., merely that an object has been detected. Where the object has been identified, such may render additional information, e.g., an object product name. Also where an object has been identified, additional information may be caused to be projected about the object, or similarly audio rendered, or additional information portrayed by a projection or on a mobile device or other display (step 436).

Returning to the flowchart 400 of FIG. 12, once an object is identified, data may be retrieved about the identified object (step 426) and flow may pass to the point "A" indicated on the flowchart 450 of FIG. 13. In addition, and as noted above, the identified object may be indicated on a mobile device or other screen, and/or be the subject of an illumination via a light projection from the CAP device in the ways noted above. Other types of indications may also be provided, such as rendering of audio indications, and the same may provide the user with the name of the object, or additional information as described. An indication of an object, or additional information about the object, may also be portrayed by projecting information onto a surface visible to the user. For example, the CAP device may detect surfaces which may be suitable for the projection of information, e.g., those that are large, flat, a solid color, or the like, and may choose such surfaces to project information. To make the projected information clear to a user, the CAP device may take into account the orientation of the surface, if such can be determined, or approximately determined, from the image or video. The presentation of the projected information can be modified according to the detected orientation or color of the surface, or based on other factors.

Returning to the flowchart 450 of FIG. 13, once an object has been identified, a determination may be made as to whether the identified object is on a user list (step 428). Such user lists may vary, and will be described in greater detail below in connection with FIG. 14. However, it will be noted here that such user lists generally include lists of objects or products of particular interest to a user, either listing products to purchase, products to avoid, or the like. The step of determining if an identified object is on a user list may further include a step similar to that noted above of retrieving data about a store layout (step 432). In particular, especially for stores a user frequents, a "purchasing plan" may be created to allow the user to move through the store and purchase needed goods while entailing traversal of a least or minimum distance, thereby allowing a more convenient and rapid shopping experience. By knowledge of the store layout and a user list, such a purchasing plan may be created by determining what needed goods are on what aisles of the store, and planning the store visit to require a minimum walking distance while still obtaining all the needed goods. In an enhanced implementation of the system and method, the CAP device may project arrows on the floor of the store (or elsewhere) leading the user along the purchasing plan (or to other desired locations).

Whether a purchasing plan is deployed or not, when a user is adjacent an object on a user list, light may be caused to be projected onto the object, or audio rendered about the indicated object, or display caused on a mobile or other device (step 434) pertaining to the indicated object. Moreover, and also as noted above, additional information may be caused to be projected about the object, or similarly audio rendered, or additional information blade on a mobile or other device (step 436).

In the above method, one or more items on a store shelf may be highlighted as a user travels through a store or other location by identifying the items on the shelf from a camera view and determining one or more items that have a set of properties, the properties then triggering a highlighting, such as projecting a light from a projector to illuminate an object or a portion thereof. Highlighting may be performed directly onto a particular object, or onto a category of objects, e.g., all the choices of shampoo on one or more store shelves. In this regard it is noted that multiple objects may be the subject of highlighting, selecting, and displaying, even those that are not within a category of products. For example, if multiple items are needed by a user and are on the same or nearby shelves of a store, the same may be simultaneously highlighted, selected, and/or displayed.

Alternatively, the "highlighting" may be by way of showing the product highlighted in an image or video of the store shelf on a mobile device screen or other screen, e.g., a headmounted display, or via a projection. The highlighting may be via the methods disclosed above, as well as using other methods. For example, whether projected or displayed on the mobile device, highlighting may be performed by darkening or otherwise obscuring a background image around the detected object. The mobile device or other screen may also provide one or more pages of information dedicated to a product. For example, a list may be provided that gives information about the one or more objects on the list.

The content, shape, distribution, color, pattern, or message portrayed by a beam of projected light may vary, and the same may in itself convey information. For example, a warning symbol, e.g., "skull and crossbones", or a red color, may be projected onto items to which the user is known to be allergic. A warning sound may be rendered. A dollar sign or other symbol indicating a purchase may be projected onto items known to be needed by a user. Other such symbols will also be understood given this disclosure.

FIGS. 14(A)-14(E) illustrate various exemplary types of user lists. For example, in FIG. 14(A), a menu 438 is illustrated having a number of entries. A particular entry 442 is illustrated as being highlighted, e.g., via a CAP device. In this implementation, the system may use information or data from a user profile or user ordering history to highlight menu entries which may be of particular interest to a user. In determining which entries to highlight, the system may separately determine the identification of menu entries or options by separately downloading or accessing the same online, or alternatively by receiving an image of the menu 438, performing optical character recognition (OCR) on the same, and using the groups of recognized characters, translated into words or phrases, as menu entries on which to base highlighting. The menu with entries may be any sort of list or menu, including a menu on a user interface of a computing environment, a restaurant menu, or the like.

Referring next to FIG. 14(B), another user list is illustrated, this being a shopping list 444. The shopping list 444 includes a number of entries, which may be placed thereon by a user using an application program, or by a system or method in which gestures cause items to be added to a user list (see FIG. 20), or in a number of other ways. FIG. 14(C) illustrates a similar list, but this figure shows a wish list 446 indicating various items thereon. In a particular implementation of FIG. 14(C), or indeed other situations, products may be highlighted by the CAP device where the same represents a particularly good deal, e.g., better than any online or physical retailer to which the system has access. Other comparative pricing options are described below.

FIG. 14(D) illustrates a product avoidance list 448. On the product avoidance list 448, various objects or products may be listed, which the user (or physician or caregiver or other person) has indicated as being potentially harmful. For example, if the user has a peanut allergy, but selects a product in which peanuts are used, a red light or other warning indication may be displayed on the product, indicating to the user that they should avoid the product. In the same way, the user may set a level of discrimination within the system and method such that, e.g., foods containing over a set percentage of an ingredient are avoided. Users may also configure the systems and methods such that, e.g., high-fat foods are avoided. Other variations will also be understood.

FIG. 14(E) illustrates yet another user list, such indicating a home inventory list 452. The home inventory list lists various items available at the home, e.g., in a home pantry. When the quantity available is below a predetermined threshold, or is, e.g., zero, such items may be bolded or otherwise indicated as needed on the home inventory list, and may then be the subject of highlighting as a user passes through a store.

Figure 15:
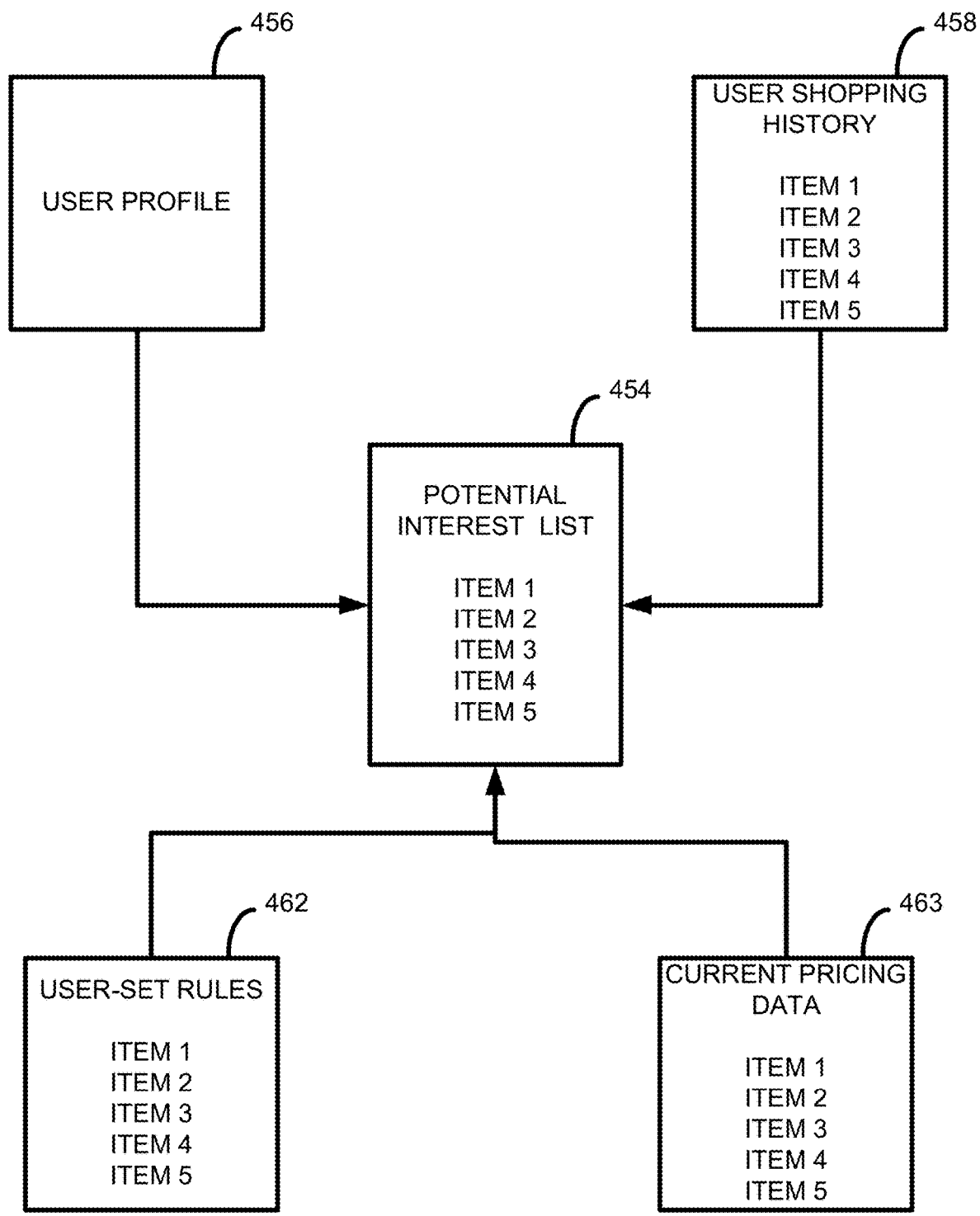
FIG. 15 is a flowchart of another exemplary embodiment according to present principles.

FIG. 15 is a flowchart 500 illustrating creation of a potential interest list 454 of items. Such items need not be on a grocery or shopping list, but may otherwise be of interest to a user, as determined by a number of aspects related to the user. For example, a user profile 456 may be employed in the creation of the potential interest list 454. In this example, the user profile 456 may indicate that a user always uses a particular brand of shampoo. The brand of shampoo may be highlighted because it is on the potential interest list 454 such that a user is reminded to purchase the same if needed. A user shopping history 458 may also be employed in the creation of the potential interest list 454. In this example, the user shopping history 458 may indicate that a user always purchases fresh bread when they are at the store. Fresh bread may thus be highlighted or illuminated as the user passes a bakery section of the store. More generally, one or more user-set rules 462 may be employed in the creation of a potential interest list 454. For example, a user may set a rule that a family dinner is generally always cooked on a weekend night. The user may then be prompted to purchase special or additional food on such occasions. Current pricing data 463 may also be employed, particularly in the case where the system recommends or highlights a regularly purchased product when such is on sale.

Using the flowchart 500, systems and methods according to present principles can use previous interactions with an object when evaluating present actions with the object, e.g., using information about prior purchases, to aid in deciding which products to highlight, such as when an object previously purchased goes on sale. Using these types of data sources, systems and methods according to present principles may be enabled to determine if a given user prefers various options, e.g., new cars versus used cars, if the user employs coupon shopping to a considerable extent, or the like, and can then use this information to determine what sort of offers should be targeted to the given user.

FIGS. 16(A)-16(C) illustrates that systems and methods according to present principles may be advantageously employed in comparative shopping as well. In particular, FIGS. 16(A) and 16(B) illustrate various types of projected information pertaining to comparison shopping. FIG. 16(A) indicates an image 464 which may be projected by the system, as instigated or caused by user selection of an object. Various comparative items or objects are illustrated, along with their associated prices, if such can be obtained from the store or from online external sources. A best value may also be shown, which may be based on price per unit quantity, price adjusted for reputation, popularity, or customer review, or on another such basis. FIG. 16(B) illustrates an image 466 showing another sort of comparison, this comparison indicating various available quantities of the same item, and price per unit. It will be understood in other implementations that alternative items, and their price per unit quantity, may also be shown. A best value is also shown in this figure, which may be that of the item and quantity having the lowest overall price per unit.

Information presented about comparative products may also include information needed to obtain the benefit of various bargains, offers, or coupons, needed to obtain the best price. For example, a store may offer savings if a certain quantity of the same object is purchased in a single transaction. In another example, a store may offer savings if a certain combination of products is purchased. Systems and methods according to present principles can determine which of the eligible combinations best fits the user's buying habits and current needs. In some cases, the system and method may only consider the best price. In another implementation, systems and methods may consider combinations even if one or more items are not currently needed by the user, especially if such items have a long shelf life and can be stored.

FIG. 16(C) shows various buttons which may be provided, which a user may press using the gesture-based user interface or may press on a touchscreen or other input mechanism of a mobile device. In some implementations, the user may be enabled to choose using a user interface provided on the CAP device as well. The buttons allow the user to choose how the comparisons noted above are performed, either with respect to the store the user is currently in (button 468), with respect to the current store and neighboring stores (button 472), and/or also including offers from online retailers (button 474). Other variations will also be understood.

FIGS. 17(A) and 17(B) illustrate other potential additional information which can be projected or displayed to a user. For example, as shown in FIG. 17(A), an image 476 may be displayed of nutritional data and/or ingredients in a particular selected item. The image may indicate, e.g., by bolding or a different color (not shown), ingredients to which the user has indicated they are sensitive to or would like to preferentially avoid (or, alternatively, include) in their diet.

FIG. 17(B) indicates how items may be indicated to a user based on other users' selections or purchases. In particular, popular or trending items may be indicated on image 478, and the user may then use such information to make purchasing decisions. For example, if the store is having a sale on a type of wine, and the wine is selling out quickly, the user may be prompted to purchase wine before quantities run out. Generally, information may be collected or aggregated from devices carried by users for analysis of consumer shopping patterns. Such may be collected passively as the user system queries about various products as the user shopping experience transpires. As the system gets queries from many users, the shopping patterns can be aggregated.

Figure 18:
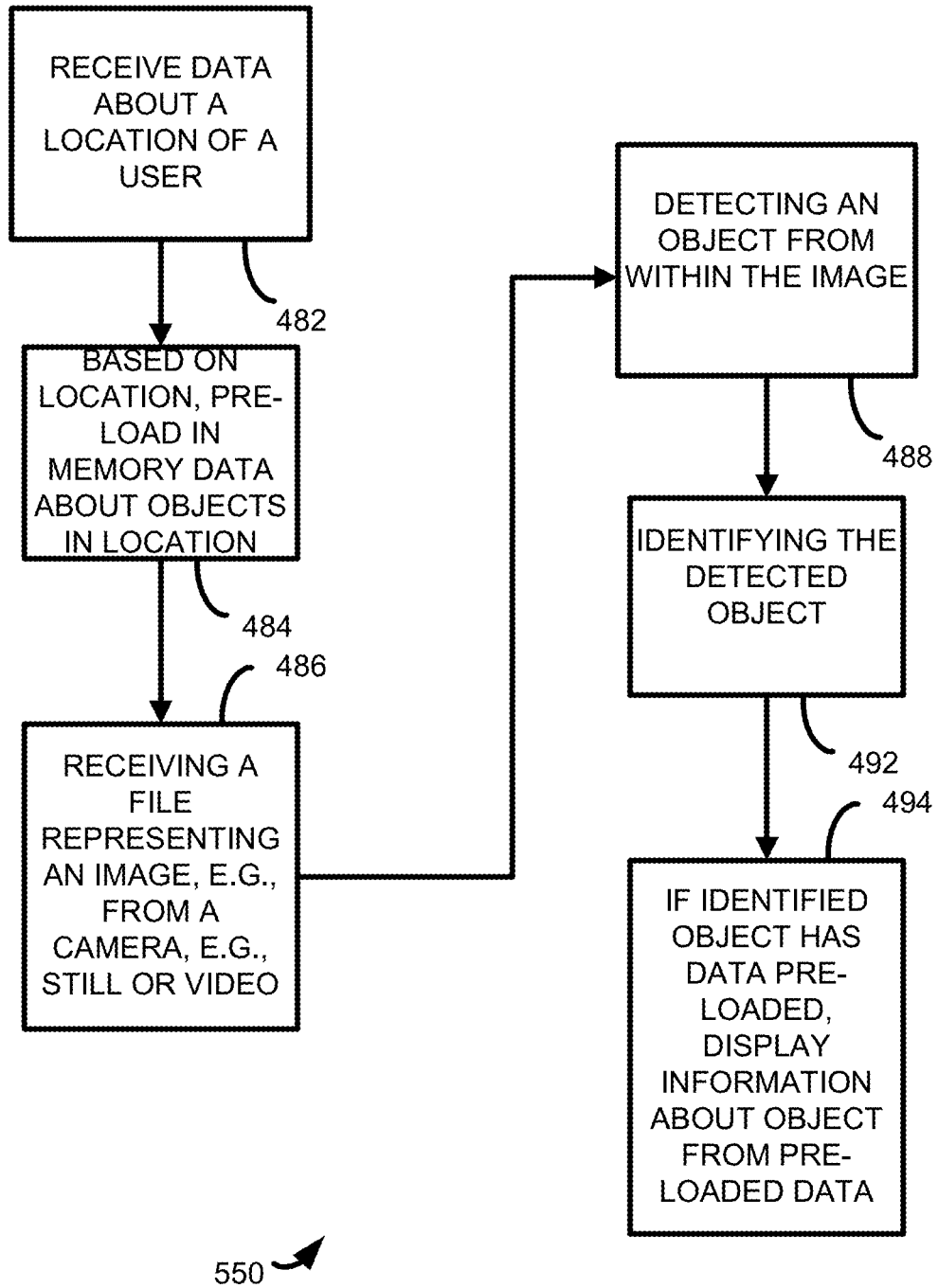
FIG. 18 is a flowchart of another exemplary embodiment according to present principles.

FIG. 18 is a flowchart 550 of another method according to present principles. In this method, pre-loading of data about objects in a particular location is performed in order to render more convenient and rapid detection and identification of subsequent objects selected by a user.

In a first step, data is received about a location of a user (step 482). At a coarse level, data may be obtained via a GPS or the like. At a finer level, GPS data may also be employed, as well as other types of data using which the location of a user may be more finely determined, e.g., WiFi, use of signal strengths in combination with triangulation, or the like. Based on the location, data may be preloaded at the mobile device or CAP device (or in some cases, the server) about objects in the location (step 484). In other words, data about objects which a user might be likely to select, given the particular location, may be preloaded so that the same may be more rapidly accessed when and if needed. In a particular example, if a user is in the shampoo aisle of the store, data about shampoos may be preloaded. Alternatively, if a user is in Yosemite National Park, data pertaining to that National Park may be preloaded. Other variations will also be understood.

Subsequent steps may be similar to those disclosed above. For example, a file may be received representing an image, e.g., from a camera (step 486). An object may be detected from within the image (step 488). The detected object may then be identified (step 492). The detection and identification steps may be performed in a similar manner to that described above. Subsequently, if the identified object has data preloaded, information about the object may be displayed or projected in manners disclosed above, where the information is retrieved in a more rapid manner using the preloaded data (step 494). In a particular example, as a user approaches a gas station, the system can look up prices of gas at the station and compare the same to that of neighboring stations, providing comparison data to the user when and if requested.

In some cases, such a determination is made upon receipt and identification of a user gesture, e.g., a user pointing at the prices. In some cases, systems and methods according to present principles will "learn", in the sense of machine learning, what such a gesture means. The systems and methods can then look for and display comparative pricing data.

Figure 19:
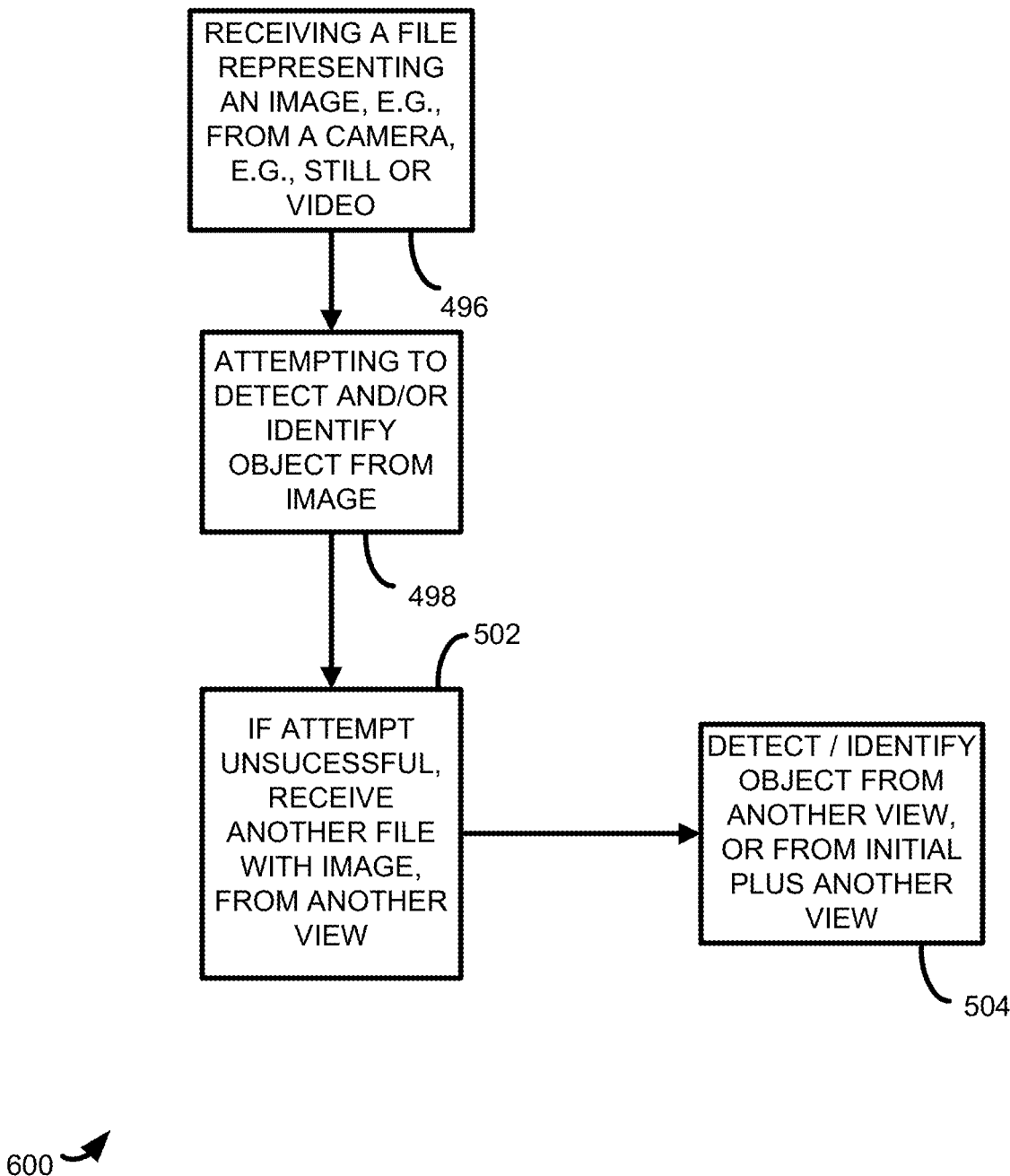
FIG. 19 is a flowchart of another exemplary embodiment according to present principles.

FIG. 19 is a flowchart 600 illustrating another method according to present principles, in which provision is made for initial unsuccessful attempts at detection and/or identification. Certain steps are similar to those disclosed above. For example, a file may be received representing an image, e.g., from a camera (step 496). The system may attempt to detect and/or identify the object from the received image (step 498). If the attempt is unsuccessful, another image may be taken and/or received, the other image from a different angle or view (step 502). The detected object may then be identified (step 504), either using the image from the different angle or view or from a combination of the initial image and the later image. In this way, additional information may be gleaned and used in an analysis for the detection and identification of objects. That is, in a particular implementation, if the server is unable to identify an object from an image, when the position of the camera relative to the object changes, the system can capture another image of the object from the new perspective, and attempt to perform the detection or identification, or both, with the new image or in combination with the old image.

As noted above, systems and methods according to present principles are not limited to highlighting objects selected by a user or on user lists. The systems and methods may be employed to place objects, products, or items onto such lists. For example, referring to the flowchart 650 of FIG. 20, an exemplary method is illustrated in which a first step is similar to those disclosed above. For example, a file may be received representing an image, e.g., from a camera (step 506). An object may be determined from the image (step 508), e.g., using the ways disclosed above. Such may include detecting an object from within the image using image analysis (step 514), or recognizing the selection of an object, e.g., by a user gesture (step 516).

The determined object may then be added to a user list (step 512). Such may include adding data about the object to a user list (step 518), where such data is available or determinable, i.e., which typically entails that the determination of the object further include identification of the object. Adding the determined object to the user list may also include simply adding an image of the object to the list (step 522). Such does not entail identification of the object, but may provide the user some ability to review the image and perform other functions about the object at a later time. Adding the determined object to a user list may also include sending an indication or notification of the determined object to an aggregating server (step 524), such that aggregate data may be used for various purposes later, e.g., consumer behavior research, or the like.

As noted above certain implementations of the systems and methods disclosed may be employed not just to highlight real-world objects but also to perform information analysis and transformation, e.g., of textual matter encountered by the user. For example, a menu in a foreign language may be translated using systems and methods disclosed herein. In the same way, foreign language street signs or other text may be translated. In particular, a server or mobile device may perform analysis such as translation on the text of an image, where the text has been determined via, e.g., optical character recognition (OCR). In an implementation, translation may be performed on a mobile device, but portions of the image that cannot reliably be recognized or translated on the mobile device may be sent to a server for more extensive OCR and/or translation. A translation of the text may then be rendered and presented or otherwise communicated to a user, or information based on the text, e.g., ingredients of a foreign language menu entry in a restaurant. For example, the translation may appear on a mobile device or may even be projected right onto the menu surface, e.g., onto a blank space adjacent the text which was translated. A projected arrow may be provided to indicate the translated text. The translation may also be rendered via audio.

Figure 21:
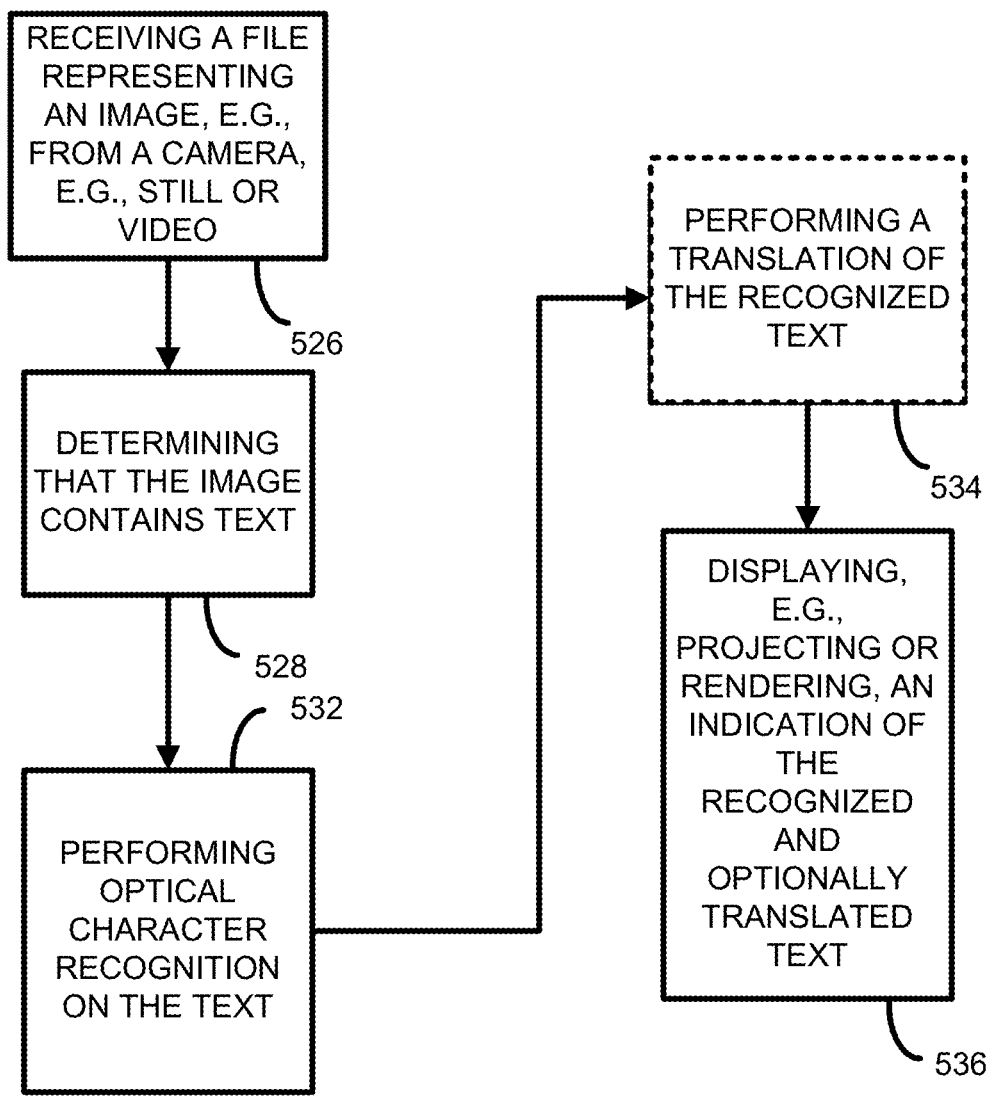
FIG. 21 is a flowchart of another exemplary embodiment according to present principles.

More generally, and referring to the flowchart 700 of FIG. 21, a file may be received representing an image, e.g., from a camera (step 526). A text may be detected from within the image (step 528). Optical character recognition may then be performed on the imaged text (step 532) to determine the information content of the text. Information pertaining to the text, which may be the text itself, or additional information relevant or pertaining to the translated text, is then displayed, e.g., projected or rendered, on a surface, mobile device, or other display (step 536). If the information content of the text determines that the text is in a foreign language, i.e., a language different from a default language preferred or selected by the user, an optional step may be performed of translating the recognized text (step 534) into a language preferred or selected by the user, or into another language as the user may direct. In this way, translation may be provided of foreign language texts encountered by the user. Translations may also be projected or displayed of text the user wishes to express (e.g., as expressed by the user verbally and transcribed by a voice recognition, or as typed or selected by the user on a user interface, e.g., that of the mobile device), such that the system and method can perform or enable translation in both directions.

Systems and methods according to present principles are disclosed for performing various functions with objects selected using a camera and projection device, and optionally a mobile device. Information about selected objects may be manipulated and employed in various ways to provide additional information to the user about objects around them.

Variations of the systems and methods according to present principles will also be understood. For example, while "identification" of an object has been employed, such identification may be minimal, and may encompass determining full knowledge of the product as well as a more simple acknowledgement that an object has been detected.

As another example, instead of identifying objects, facial recognition software may be employed to recognize and provide information to a user about nearby persons. The information can include items such as previous meetings and scheduled future meetings. Such an implementation would be particularly advantageous for professional contacts, such as people that meet each other occasionally at conferences. As noted above, data projected by the CAP device, or portrayed on an associated mobile device menu, may include context menus using which a user may obtain additional information about a product.

In another variation, while the systems and methods according to present principles described above are generally in the context of shopping, such may be advantageously employed in traveling or vacationing, leading tours, as functionality provided during a scavenger hunt, or the like.

In another variation, whenever information or data is presented to a user, such as on a list or via a set of images, systems and methods according to present principles may filter or prioritize such presented information or data.

In another variation, while the above description has primarily focused on implementations in which a camera and projector system are carried by a user, it will be understood that cameras and projectors may be implemented within a store, e.g., on store shelves or ceilings, to provide equivalent functionality. In this way, a user may be enabled to take advantage of such systems without the need to carry any electronics with them. In the same way, such cameras may serve as convenient inputs to a security system. The systems and methods may receive data identifying a particular user in a number of ways, so as to allow access to user lists, user profile information, or other data about the user as has been disclosed. For example, a user may enter their location, e.g., a store identity, on their mobile device. A user "check-in" on a social networking site may be similarly employed. The system may sense the presence of the user by detecting a mobile device, and may determine the identity of the user from the same if allowed by the mobile device privacy settings. Various other ways of determining user identity for use by a store server in a camera and projection system will also be understood, given this teaching. For example, facial recognition may be employed in this capacity.

It will further be understood that, while the above description primarily describes systems and methods in which the light source/projector, camera, and/or display screen are mobile, they do not necessarily need to be so. One or more or all of the components may be stationary. For example, and as noted above, the user may typically carry a mobile device but the remainder of the components may be stationary and operated by a store. Alternatively, the mobile device and/or a headmounted or wearable display may be employed to provide information and data to the user, but the projector and camera may be stationary and operated by the store.

One implementation includes one or more programmable processors and corresponding computer system components to store and execute computer instructions and data, such as to provide the structures, systems, and interfaces to provide the object identification, analysis, and indicator system. One such computing environment is disclosed below.

Figure 22:
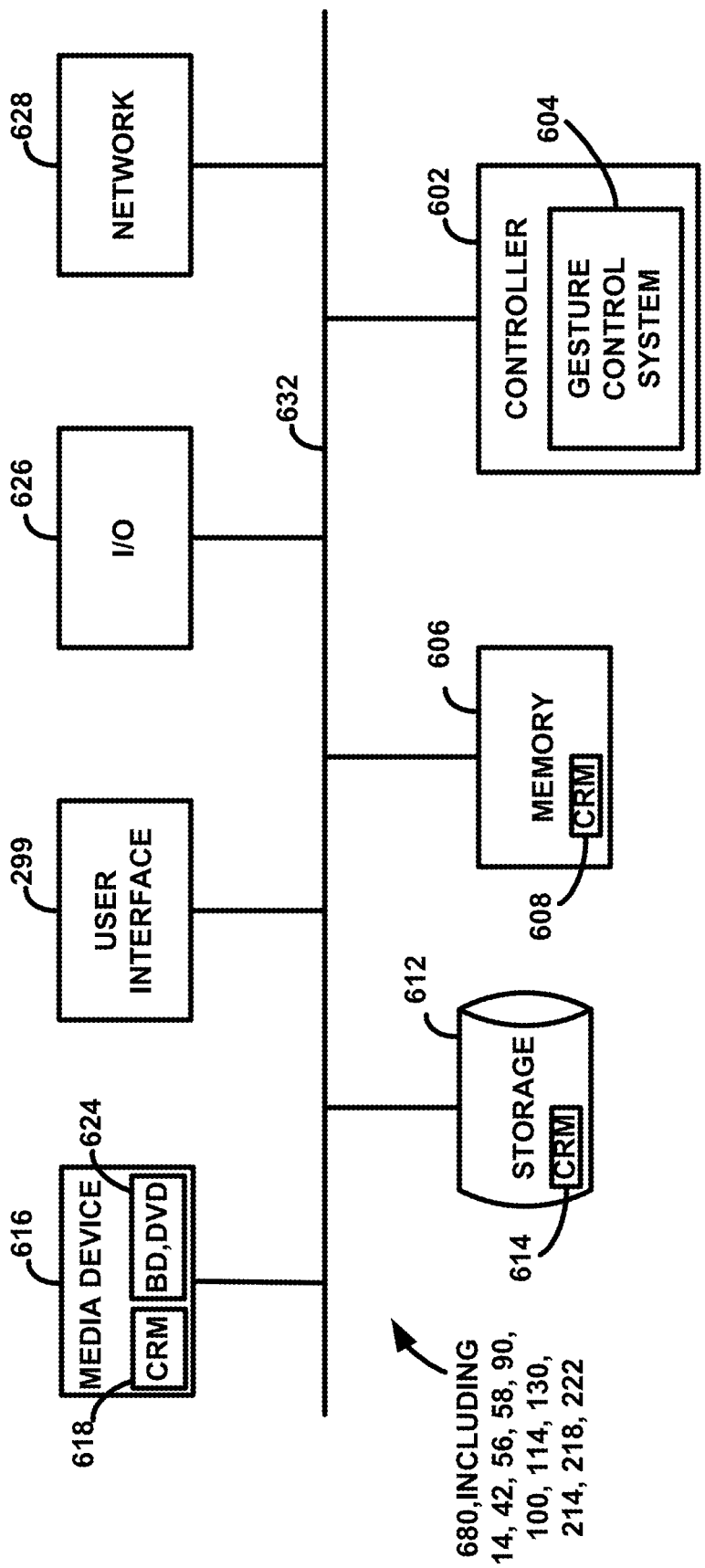
FIG. 22 is an exemplary computing environment in which the methods according to present principles may be implemented.

Referring to FIG. 22, a representation of an exemplary computing environment 680 in which the system and method may be implemented is illustrated.

The computing environment 680 includes a controller 602, a memory 606, storage 612, a media device 616, a user interface 299, an input/output (I/O) interface 626, and a network interface 628. The components are interconnected by a common bus 632. Alternatively, different connection configurations can be used, such as a star pattern with the controller at the center.

The controller 602 includes a programmable processor and controls the operation of a gesture control system 604. The controller 602 loads instructions from the memory 606 or an embedded controller memory (not shown) and executes these instructions to control the system.

Memory 606, which may include non-transitory computer-readable memory 608, stores data temporarily for use by the other components of the system. In one implementation, the memory 606 is implemented as DRAM. In other implementations, the memory 606 also includes long-term or permanent memory, such as flash memory and/or ROM.

Storage 612, which may include non-transitory computer-readable memory 614, stores data temporarily or long-term for use by other components of the system, such as for storing data or instructions. In one implementation, the storage 612 is a hard disc drive, a solid state drive, or cloud storage.

The media device 616, which may include non-transitory computer-readable memory 618, receives removable media and reads and/or writes data to the inserted media. In one implementation, the media device 616 is an optical disc drive or disc burner, e.g., a writable Blu-ray® disc drive 624.

The user interface 299 includes components for accepting user input, e.g., the user indication of gestures, objects, items or other aspects discussed above, and presenting a display, e.g., an indicator of an item or a menu or additional information, to the user. In one implementation, the user interface 299 includes the camera and projector noted above, as well as in some cases a keyboard, a mouse, audio speakers, and a display. The controller 602 uses inputs entered by the user to adjust the operation of the computing environment.

The I/O interface 626 includes one or more I/O ports to connect to corresponding I/O devices, such as external storage or supplemental devices, e.g., a printer or a PDA. In one implementation, the ports of the I/O interface 626 include ports such as: USB ports, PCMCIA ports, serial ports, and/or parallel ports. In another implementation, the I/O interface 626 includes a wireless interface for wireless communication with external devices, e.g., to a market or other Internet server or other source of information about indicated or selected products, items, or other objects. These I/O interfaces may be employed to connect to one or more content playback devices.

The network interface 628 allows connections with the local network and includes a wired and/or wireless network connection, such as an RJ-45 or Ethernet connection or Wi-Fi interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The methods shown and described above may be implemented in one or more general, multi-purpose, or single-purpose processors. Unless specifically stated, the methods described herein are not constrained to a particular order or sequence. In addition, some of the described methods or elements thereof can occur or be performed concurrently.

Functions/components described herein as being computer programs are not limited to implementation by any specific embodiments of computer programs. Rather, such functions/components are processes that convey or transform data, and may generally be implemented by, or executed in, hardware, software, firmware, or any combination thereof.

It will be appreciated that particular configurations of the operating environment may include fewer, more, or different components or functions than those described. In addition, functional components of the operating environment may be implemented by one or more devices, which are co-located or remotely located, in a variety of ways.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be construed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

The invention claimed is:

1. A method for selecting and obtaining information about objects while shopping using a mobile device and multiple monitoring cameras which are located on shelves or a ceiling of a physical retail store, comprising:

transmitting, by the mobile device, a code to control access to a nearby network device, the nearby network device being a store server;

identifying, by the store server, a user of the mobile device by the code or by the mobile device;

detecting, by one or multiple of the monitoring cameras located on the shelves or the ceiling, an indication that an object has been picked up by the user;

analyzing, by the store server, the object against a database of objects in the physical retail store using object recognition analysis to identify the object;

adding the identified object to a user list and sending an indication or notification of the identified object to an aggregating server, the indication or notification including a price of the identified object;

wherein the user list constitutes a shopping list of products to purchase;

causing a purchase transaction of objects on the user list passively in a single transaction;

projecting, by a projector activating a light source within the projector in response to identifying the object, information pertaining to the identified object on a surface of the physical retail store viewable by the user, the information including a virtual button selectable by gesture detection;

analyzing, by the store server, an image detecting that the user, via gesture, is selecting the virtual button; and updating, by the projector in response to the gesture detection selection, the projected information to include additional information about the identified object.

2. The method of claim 1, wherein the user is further identified using facial recognition.

3. The method of claim 1, wherein the identifying the object includes analyzing an imaged SKU, barcode, or other item identifier.

4. The method of claim 1, wherein if a first image analysis of a received image does not result in an identified object, repeating the image analysis from another angle or view.

5. The method of claim 1, wherein the information pertaining to the identified object is selected from the group consisting of: nutritional information, ingredient information, comparison shopping information about other products similar to the identified object, comparison shopping information about other quantities available of the identified object, including a price per unit, or an indication of a best value product, either of a particular quantity of the identified object or of a quantity and type of a product similar to the identified object.

6. The method of claim 1, further comprising:
 a. receiving a location of the user;
 b. pre-loading data about the objects in or corresponding to the location,
 c. such that if the identified object corresponds to one of the pre-loaded objects in the location, data about the identified object is retrieved in a more rapid manner than in the absence of the pre-loading.

7. The method of claim 6, wherein the receiving the location is performed at least in part using GPS, triangulation using WiFi transmitters, RFID, or a combination.

8. The method of claim 6, wherein the location is entered by the user on a user interface of the mobile device.

* * * * *